(12) United States Patent
Yoshida

(10) Patent No.: US 9,977,632 B2
(45) Date of Patent: May 22, 2018

(54) APPARATUS AND METHOD FOR PROCESSING INFORMATION ON FILE OR JOB

(71) Applicant: KONICA MINOLTA, INC., Chiyoda-ku, Tokyo (JP)

(72) Inventor: Okihisa Yoshida, Kawanishi (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days. days.

(21) Appl. No.: 14/921,628

(22) Filed: Oct. 23, 2015

(65) Prior Publication Data
US 2016/0117135 A1 Apr. 28, 2016

(30) Foreign Application Priority Data

Oct. 27, 2014 (JP) ................................. 2014-218186
Jan. 23, 2015 (JP) ................................. 2015-011243

(51) Int. Cl.
*G06F 3/12* (2006.01)

(52) U.S. Cl.
CPC ............ *G06F 3/1222* (2013.01); *G06F 3/122* (2013.01); *G06F 3/126* (2013.01); *G06F 3/1238* (2013.01);
(Continued)

(58) Field of Classification Search
None
See application file for complete search history.

(56) References Cited

U.S. PATENT DOCUMENTS 8,819,694 B2 * 8/2014 Corona ................. G06F 9/5044
358/1.13
9,021,084 B2 * 4/2015 Chapin ................... H04L 41/12
709/220
(Continued)

FOREIGN PATENT DOCUMENTS

JP 2002049478 A 2/2002
JP 2008250972 A 10/2008
(Continued)

OTHER PUBLICATIONS

Notice of Grounds of Rejection issued by the Japanese Patent Office dated Nov. 15, 2016, in corresponding Japanese application No. 2014-218186, with full English translation (10 pages).
(Continued)

*Primary Examiner* — Dung D Tran
(74) *Attorney, Agent, or Firm* — Buchanan Ingersoll & Rooney PC

(57) ABSTRACT

An information processing apparatus which can be connected to a first network includes a connection acceptance portion which accepts connection to the first network from a first device, a job acceptance portion which accepts a job output from the first device connected to the first network to a second network different from the first network, and a transfer portion which transfers, when the job is a job held in a second holding portion included in the second network and designated to be executed in response to acceptance of an execution instruction from a user in the second network, the job to a first holding portion such that the job is held in the first holding portion included in the first network.

24 Claims, 16 Drawing Sheets

(52) U.S. Cl.
CPC .......... *G06F 3/1267* (2013.01); *G06F 3/1274* (2013.01); *G06F 3/1288* (2013.01)

(56) References Cited

U.S. PATENT DOCUMENTS

| | | | | |
|---|---|---|---|---|
| 9,030,688 | B2* | 5/2015 | Krajicek | G06F 3/1204 |
| | | | | 358/1.14 |
| 9,064,207 | B2* | 6/2015 | Yamada | G06F 3/1222 |
| 9,081,520 | B2* | 7/2015 | Mraz | G06F 3/1203 |
| 2009/0013065 | A1 | 1/2009 | Nagashima | |
| 2009/0059273 | A1 | 3/2009 | Tomita | |
| 2009/0059274 | A1* | 3/2009 | Tomita | G06F 3/1204 |
| | | | | 358/1.15 |
| 2009/0165012 | A1* | 6/2009 | Corona | G06F 9/5044 |
| | | | | 718/105 |
| 2010/0238477 | A1* | 9/2010 | Tanaka | G06F 3/1204 |
| | | | | 358/1.13 |
| 2011/0188064 | A1* | 8/2011 | Awata | G06F 3/12 |
| | | | | 358/1.13 |
| 2012/0188583 | A1* | 7/2012 | Stone | G06F 3/1288 |
| | | | | 358/1.14 |
| 2013/0194623 | A1* | 8/2013 | Tecu | G06F 3/1204 |
| | | | | 358/1.15 |

FOREIGN PATENT DOCUMENTS

| | | |
|---|---|---|
| JP | 2009-015520 A | 1/2009 |
| JP | 2009-054005 A | 3/2009 |
| JP | 2009-054006 A | 3/2009 |
| JP | 2009205659 A | 9/2009 |
| JP | 2015-065564 A | 4/2015 |

OTHER PUBLICATIONS

Notice of Grounds of Rejection issued by the Japanese Patent Office dated Mar. 28, 2017, in corresponding Japanese application No. 2015-011243, with full English translation (7 pages).

Chinese Office Action dated Nov. 30, 2017 issued in corresponding Chinese Application No. 201510703839.6, with English translation (14 pages).

* cited by examiner

APPARATUS AND METHOD FOR PROCESSING INFORMATION ON FILE OR JOB

This application is based on Japanese Patent Applications Nos. 2014-218186 and 2015-011243 filed with the Japan Patent Office on Oct. 27, 2014 and on Jan. 23, 2015, respectively, the entire content of which is hereby incorporated by reference.

BACKGROUND OF THE INVENTION

Field of the Invention

This disclosure relates to an apparatus and a method for information processing and particularly to an apparatus and a method for information processing which perform processing for managing a file or a job.

Description of the Related Art

Japanese Laid-Open Patent Publication No. 2009-054005 or 2009-054006 discloses a system as follows. Namely, a print job is output to a network to which one or more image formation apparatuses are connected. A user logs in any image formation apparatus of the one or more image formation apparatuses and has the image formation apparatus process the print job. The print job is held in a server included in the system. Alternatively, the system does not have to include a server. The print job may be held in any image formation apparatus of the one or more image formation apparatuses.

By making use of this system, the user does not have to be conscious about an apparatus holding a print job. The user can instruct any image formation apparatus included in the system to process a job, simply by logging in the image formation apparatus.

Offices have recently expanded extensively. One or more networks are constructed in one office. A network here means a communication environment such as local area network (LAN) in which one or more devices can be connected. As the offices spread over wide areas, a network can communicate with other networks. For example, a network in the Tokyo head office and a network in the Osaka branch can communicate with each other.

A user desires to use his/her own information processing apparatus which can be connected to a first network also in a second network as in the first network. For example, when a user having a terminal apparatus which can be connected to the network in the Tokyo head office goes on a business trip to the Osaka branch with his/her terminal apparatus, he/she may desire to connect the terminal apparatus to the network in the Osaka branch and use the terminal apparatus.

In connection with file management, for example, Japanese Laid-Open Patent Publication No. 2009-015520 discloses a technique for selecting one of devices belonging to another sub area as a default device when connection to another sub area is established.

One method for meeting the user's demand above includes a method of copying a file of interest from a network where the file is saved to a network at a destination of a device and using the file.

In order to allow connection of a terminal apparatus to a different network in order to meet the demand, however, a complicated operation is required. For example, a user should register an address of an image formation apparatus to be connected to a new network in a printer driver installed in the terminal apparatus. Furthermore, the user has to set information on the new network in the terminal apparatus.

Though the user can use the file copied as above in the network at the destination of the device, the file remains in the network at the destination unless the file is deleted after use. Namely, without a right to access the network at the destination from the device or a right to delete the file after the device returned to its original network, the device cannot delete the file from the network at the destination.

If the file remains in the network at the destination, a storage area in the network is wasted and a security issue associated with the file may also arise.

SUMMARY OF THE INVENTION

One of objects of the present disclosure is to provide an information processing apparatus which allows use of a printing system widely in a simplified manner. Another one of objects of the present disclosure is to provide an image formation apparatus which allows use of a printing system widely in a simplified manner. Another one of objects of the present disclosure is to provide a job processing method which allows use of a printing system widely in a simplified manner. Another one of objects of the present disclosure is to provide a medium for recording a program which allows use of a printing system widely in a simplified manner.

An object in another aspect of the present disclosure is to provide an information processing apparatus capable of appropriate management of a file associated with movement between different networks. An object in one aspect of the present disclosure is to provide an image formation apparatus capable of appropriate management of a file associated with movement between different networks. An object in one aspect of the present disclosure is to provide an information processing apparatus capable of appropriate management of a file associated with movement between different networks. An object in one aspect of the present disclosure is to provide a medium for recording a program capable of appropriate management of a file associated with movement between different networks.

An information processing apparatus which can be connected to a first network according to one embodiment includes a connection acceptance portion which accepts connection from a first device to the first network, a job acceptance portion which accepts a job output from the first device connected to the first network to a second network different from the first network, and a transfer portion which transfers, when the job is a job held in a second holding portion included in the second network and designated to be executed in response to acceptance of an execution instruction from a user in the second network, the job to a first holding portion such that the job is held in the first holding portion included in the first network.

Preferably, the information processing apparatus further includes a request portion which requests for determination as to whether or not the user is a user who is permitted to execute the job by outputting information on the user to the second network. The transfer portion transfers the job to the first holding portion when the user is determined in the second network as the user who is permitted to execute the job.

Preferably, the information processing apparatus further includes a management portion which has a storage portion included in the first network store the information on the user when it is determined in the second network that the user is the user who is permitted to execute the job.

Preferably, the management portion has the storage portion store the information on the user for a defined period.

Preferably, the information processing apparatus further includes a setting portion which sets the defined period.

Preferably, in the information processing apparatus, when the information on the user is stored in the storage portion, the transfer portion transfers the job to the first holding portion without issuing a request from the request portion.

Preferably, the first network includes one or more image formation apparatuses and the information processing apparatus further includes a first specifying portion which specifies one image formation apparatus among the one or more image formation apparatuses included in the first network. The storage portion is included in one specified image formation apparatus.

Preferably, the first network includes one or more image formation apparatuses. The storage portion is included in each of the one or more image formation apparatuses included in the first network.

Preferably, the first network includes one or more image formation apparatuses. The information processing apparatus further includes a second specifying portion which specifies one image formation apparatus among the one or more image formation apparatuses included in the first network. The first holding portion is included in one specified image formation apparatus.

Preferably, when the job acceptance portion does not accept the job from the user for a predetermined period after the information on the user is stored in the storage portion, the management portion deletes the information on the user from the storage portion.

Preferably, the information processing apparatus further includes an extraction portion which extracts a file associated with the first device from the first holding portion and a deletion portion which deletes the file extracted by the extraction portion from the first holding portion when the first device terminates connection to the first network and connects to the second network.

Preferably, the deletion portion deletes the file associated with the first device from the first holding portion when a notification of connection of the first device to the second network is given from a second device connected to the second network.

Preferably, the extraction portion extracts the file associated with the first device from the first holding portion based on a history of operation on the file associated with the first device.

Preferably, the extraction portion extracts from the first holding portion, the file associated with the first device and output in the first network.

Preferably, the extraction portion extracts from the first holding portion, the file associated with the first device and not output in the first network, among files stored in the first holding portion.

Preferably, the extraction portion extracts from the first holding portion, a file designated by an operation by the user, among files stored in the first holding portion.

Preferably, the first network and the second network each include one or more image formation apparatuses. The file is print job data. When the information processing apparatus accepts a print instruction to the second network from the first device connected to the first network, it stores the file which is the print job data in the first holding portion.

Preferably, the information processing apparatus further includes a transmission portion which transmits the file deleted from the first holding portion by the deletion portion to the second holding portion.

In another embodiment, an image formation apparatus incorporating the information processing apparatus is provided.

An information processing method according to yet another embodiment includes accepting connection to a first network from a first device, accepting a job output to a second network different from the first network from the first device connected to the first network, and transferring, when the job is a job held in a second holding portion included in the second network and designated to be executed in response to acceptance of an execution instruction from a user in the second network, the job to a first holding portion such that the job is held in the first holding portion included in the first network.

Preferably, the information processing method further includes extracting a file associated with the first device from the first holding portion and deleting the extracted file from the first holding portion when the first device terminates connection to the first network and thereafter connects to the second network.

A program recording medium is provided in yet another embodiment. A non-transitory computer-readable storage medium storing a program causing a computer to perform accepting connection to a first network from a first device, accepting a job output to a second network different from the first network from the first device connected to the first network, and transferring, when the job is a job held in a second holding portion included in the second network and designated to be executed in response to acceptance of an execution instruction from a user in the second network, the job to a first holding portion such that the job is held in the first holding portion included in the first network.

Preferably, the program causes the computer to further perform extracting a file associated with the first device from the first holding portion and deleting the extracted file from the first holding portion when the first device terminates connection to the first network and thereafter connects to the second network.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
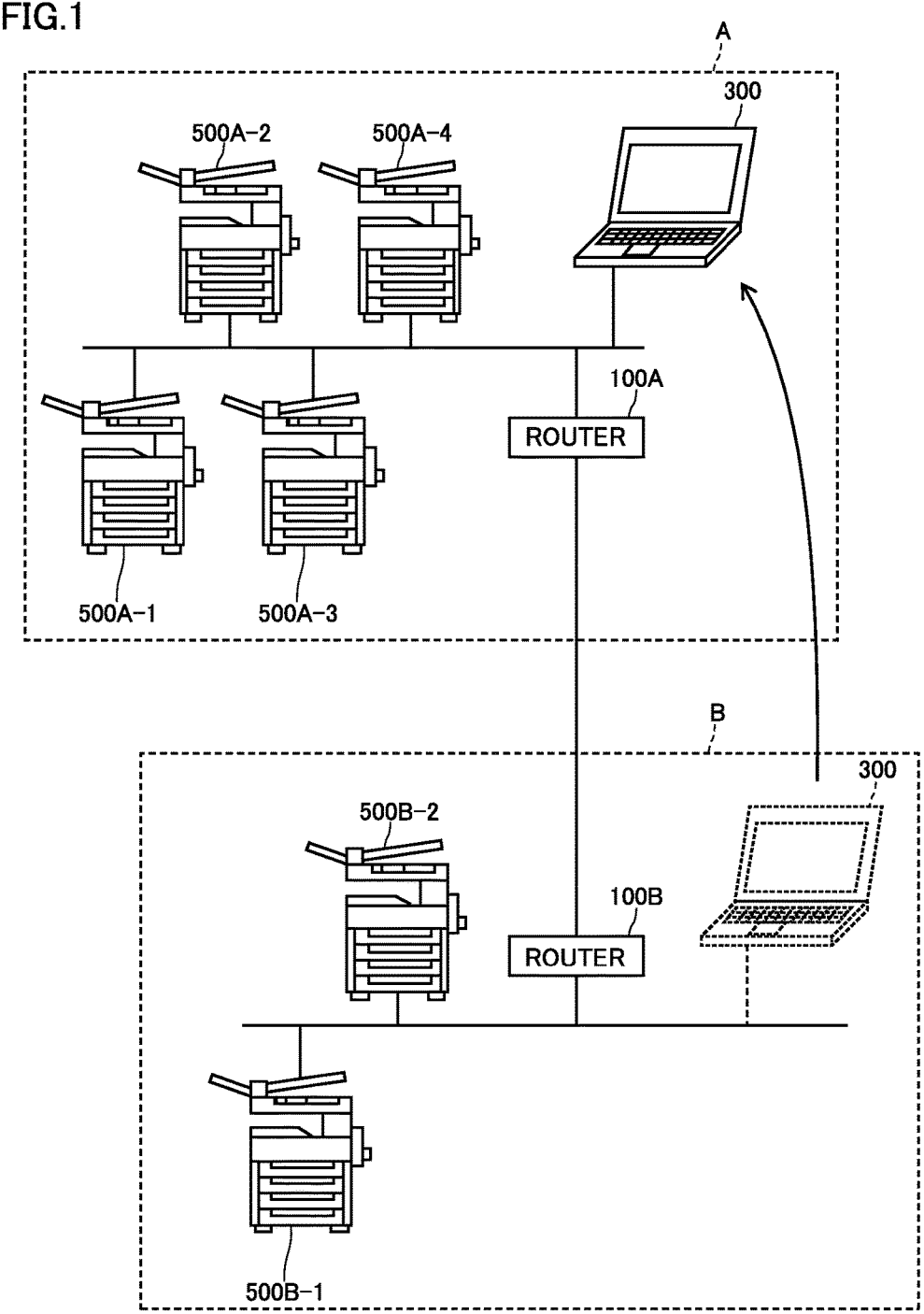
FIG. 1 is a diagram representing one example of a configuration of an image processing system according to each embodiment.

An embodiment of the present invention will be described hereinafter with reference to the drawings. In the description below, the same elements and components have the same reference characters allotted. Their label and function are also identical. Therefore, description thereof will not be repeated.

First Embodiment

System Configuration

FIG. 1 is a diagram representing one example of a configuration of an image processing system (hereinafter simply referred to as a system) according to the present embodiment. Referring to FIG. 1, the present system includes a network A and a network B. Network A and network B are electrically connected to each other through routers 100A and 100B (hereinafter also collectively referred to as a router 100).

Each network is a local area network (LAN) and installed in a specific area. The network is not a network in which an unspecified number of devices can be connected, such as the Internet, but only specific devices can be connected therein. Remotely constructed networks such as a network constructed in the Tokyo head office and a network constructed in the Osaka branch are assumed as networks A and B. These networks are connected to be able to communicate with each other through router 100.

Each network includes one or more image formation apparatuses. Namely, referring to FIG. 1, network A includes multi-functional peripherals (MFPs) 500A-1, 500A-2, 500A-3, and 500A-4. Network B includes MFPs 500B-1 and 500B-2. The MFP represents one example of an image formation apparatus. In the description below, MFPs 500A-1, . . . will also collectively be referred to as an MFP 500.

Routers 100A and 100B represent one example of an information processing apparatus. Any apparatus may be adopted as an information processing apparatus included in a network, so long as it can communicate with an information processing apparatus included in another network. For example, as shown in FIG. 1, it may be a router, a server, or one of MFPs 500. Alternatively, the information processing apparatus may be a part of such an apparatus. In other words, the information processing apparatus may be mounted on one of MFPs 500.

Both of networks A and B can be connected to such an information device as a terminal apparatus. MFP 500 included in networks A and B processes a job for printing (hereinafter referred to as a print job) output from an information device connected to each network.

Referring to FIG. 1, a personal computer (PC) 300 representing one example of an information device is normally connected to network B. PC 300 corresponds, for example, to a PC used by a user who works in the Osaka branch by connecting to network B installed in the Osaka branch.

When the user goes on a business trip to the Tokyo head office with his/her PC 300, the user can connect PC 300 to network A installed in the Tokyo head office as shown in FIG. 1.

<Apparatus Configuration>

Figure 2:
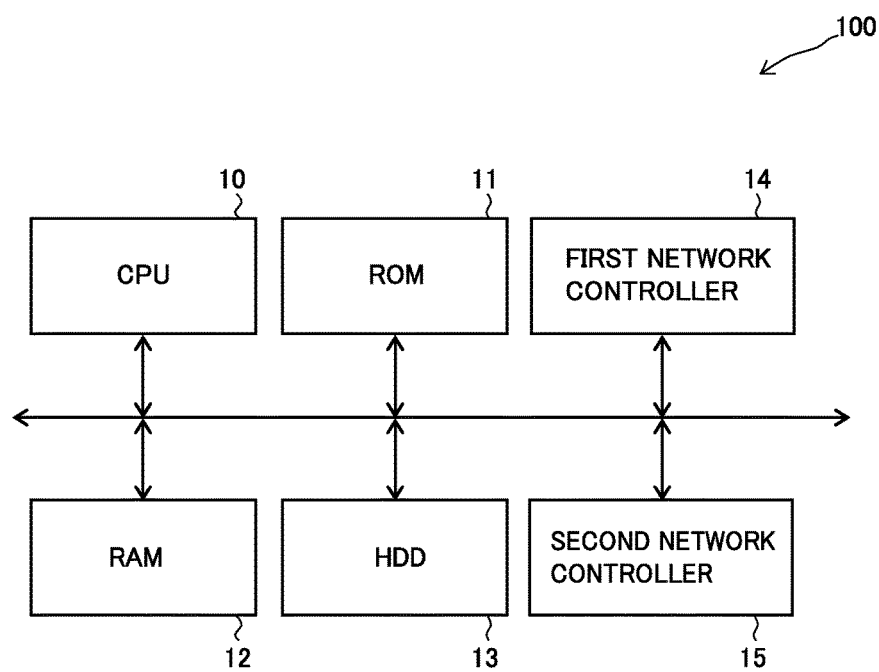
FIG. 2 is a block diagram representing one example of a hardware configuration of a router representing one example of an information processing apparatus included in the system.

FIG. 2 is a block diagram representing one example of a hardware configuration of router 100 representing one example of the information processing apparatus. Referring to FIG. 2, router 100 includes a central processing unit (CPU) 10 for overall control of the apparatus. Router 100 includes a read only memory (ROM) 11 for storing a program executed by CPU 10, a random access memory (RAM) 12 serving as a work area in execution of a program by CPU 10, and a hard disk drive (HDD) 13 representing one example of a storage for storing various types of information. Router 100 includes a first network controller 14 and a second network controller 15. First network controller 14 controls communication with another apparatus connected to a network to which router 100 belongs. Second network controller 15 controls communication with a router included in another network.

The storage stores in advance information on such a device as PC 300 or MFP 500 normally connected to each network and information on a user who uses the device.

The hardware configuration of the information processing apparatus is not limited to the configuration in FIG. 2. When the information processing apparatus is another apparatus such as a server or an MFP, another configuration suitable for another apparatus is further included.

Figure 3:
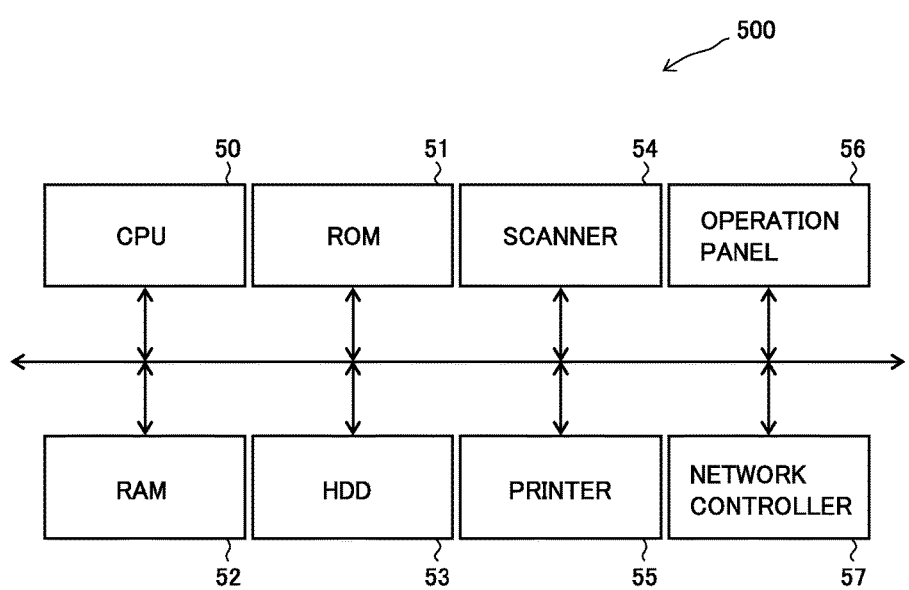
FIG. 3 is a block diagram representing one example of a hardware configuration of a multi-functional peripheral (MFP) representing one example of an image formation apparatus included in the system.

FIG. 3 is a block diagram representing one example of a hardware configuration of MFP 500 representing one example of an image formation apparatus. Referring to FIG. 3, MFP 500 includes a CPU 50 for overall control of an apparatus. MFP 500 includes a ROM 51 for storing a program executed by CPU 50, a RAM 52 serving as a work area in execution of a program by CPU 50, and an HDD 53 representing one example of a storage for storing image data. MFP 500 includes a scanner 54, a printer 55, an operation panel 56, and a network controller 57. Network controller 57 controls communication with another apparatus included in a network to which MFP 500 belongs.

<Operation Overview>

In the present system, each network can process a print job which is what is called ubiquitous printing.

Namely, PC 300 connected to network B outputs a print job in response to an operation by a user. One MFP 500B-1 included in network B receives the print job and stores the print job in a memory. MFP 500B which receives the print job output from PC 300 may be predetermined in accordance with PC 300 or an issuing user who has issued the print job. Alternatively, MFP 500B may be designated by the issuing user at the time when the print job is issued.

Alternatively, MFP 500B may automatically be determined at the timing of issuance of the print job. When the issuing user logs in one MFP 500B-2 included in network B, MFP 500B-2 inquires of each MFP 500B included in network B about the print job issued by the user. In response to the inquiry, information on the print job is transferred from MFP 500B-1 to MFP 500B-2. The information on the print job is, for example, a name of the print job (a job name). The information on the print job issued by the user is presented to MFP 500B-2 so as to allow selection. MFP 500B-2 accepts from the user, selection of the print job to be processed. When selection is accepted, MFP 500B-2 obtains print job main body data from MFP 500B-1 and processes the obtained data. Thus, the user does not have to be conscious about an MFP holding the print job. Then, the user can process the print job issued by the user himself/herself in any MFP 500B included in network B.

The above is processing of a print job called ubiquitous printing. The operations above are processing of a print job which is what is called serverless ubiquitous printing, in which a server dedicated for holding a print job in a network (what is called a document server) is not included. In this example, a document server is not included in networks A and B. A document server, however, may be included in networks A and B. In the description below, an MFP (MFP 500B-1 in the example above) which holds a print job is also referred to as a "storage MFP." An MFP (MFP 500B-2 in the example above) which accepts log-in by a user and processes a print job is also referred to as a "client MFP."

In the system according to the present embodiment, a user of PC 300 connects PC 300, which is normally connected to network B, to network A and issues a print job. When PC 300 is connected to a new network, information necessary for connecting PC 300 to network A is allocated to PC 300. For example, such a scheme as dynamic host configuration protocol (DHCP) is made use of for allocation of the information to PC 300. Alternatively, the user may set the information in PC 300. Thus, PC 300 can communicate with another apparatus connected to network A.

Figure 4:
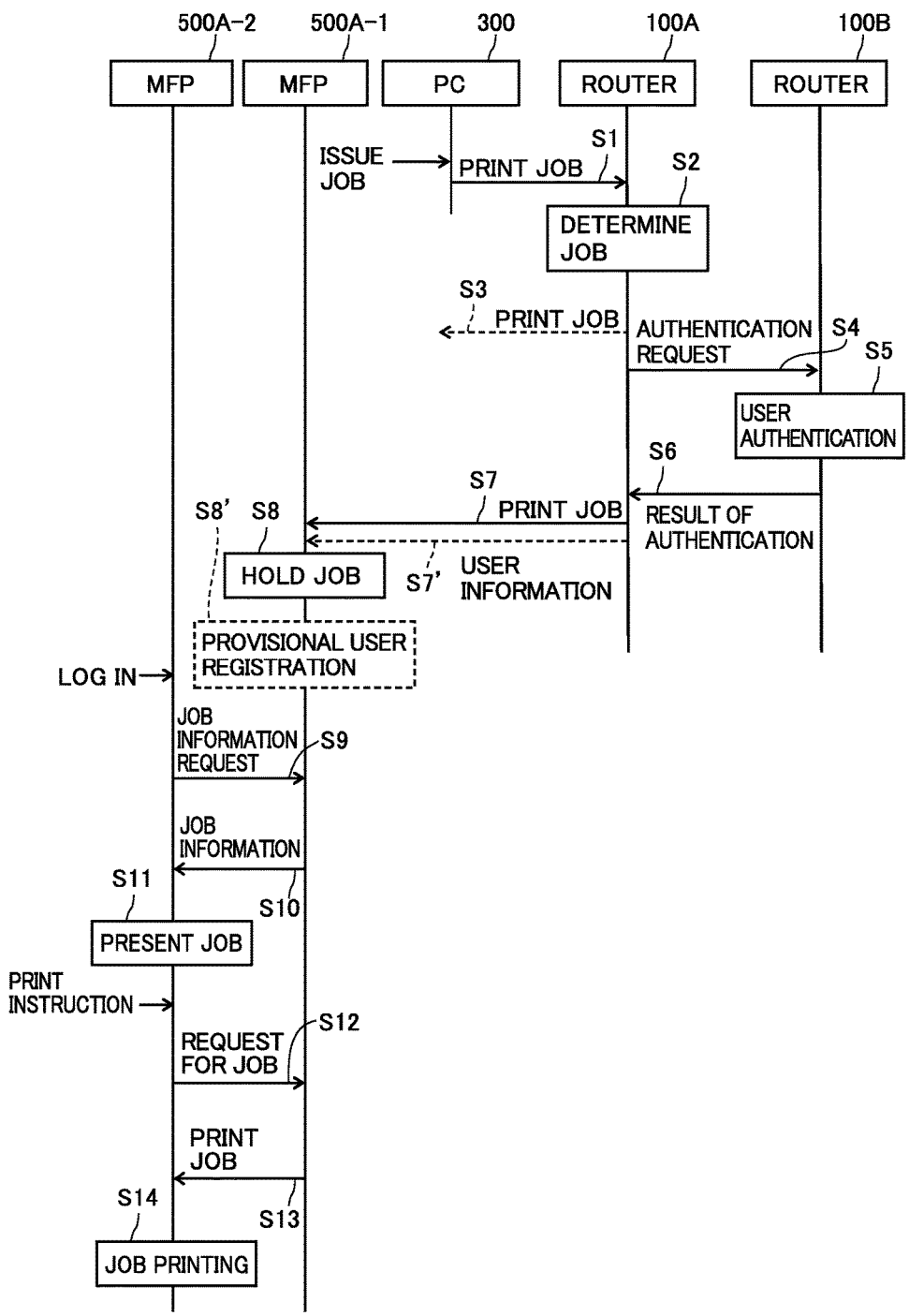
FIG. 4 is a diagram representing overview of operations in the system according to a first embodiment.

FIG. 4 is a diagram representing overview of operations in the present system at the time when a print job is issued from PC 300 connected to network A.

Referring to FIG. 4, PC 300 connected to network A accepts an operation by a user to issue a print job. This operation is the same as an operation at the time of connection to network B for execution of ubiquitous printing. When the operation is accepted, PC 300 issues a print job (step S1).

Router 100A in network A detects output of the print job from PC 300 by monitoring communication within network A. Router 100A temporarily captures the print job output from PC 300.

Router 100A determines, by referring to a destination of the print job, whether the print job is a job for executing ubiquitous printing in network A (hereinafter also referred to as a ubiquitous print job), a ubiquitous print job directed to another network, or a normal print job for execution of printing in a designated MFP rather than a ubiquitous job (step S2). Information representing whether a job is a ubiquitous print job or a normal print job may be added to the print job. In this case, router 100A determines whether the print job is a ubiquitous print job or a normal print job by referring to the added information.

When the print job from PC 300 is not a ubiquitous print job but a normal print job for execution of printing in a designated MFP, router 100A transfers the print job to the designated MFP (step S3). The print job is processed in the designated MFP.

When the print job from PC 300 is a ubiquitous print job, router 100A transfers the print job to MFP 500A-1 which serves as the storage MFP in network A (step S7).

Preferably, when the print job from PC 300 is the ubiquitous print job directed to network B different from network A, router 100A reads from the print job, information necessary for determining whether or not the user is a user who is permitted to execute ubiquitous printing, such as information on an issuing user. Then, router 100A transfers the read information to router 100B in network B and requests for user authentication for making determination about the user (step S4). In response to this request, user authentication is carried out in a device in network B such as router 100B (step S5).

More preferably, a device in network B which has authenticated a user such as router 100B or a storage MFP in network B holds, as an access history, the fact that router 100A in another network (network A) has requested for user authentication or the fact that the user was authenticated in response to the request. Furthermore, such a device may also hold as the access history, a job name for which user authentication has been requested. Such an access history corresponds to a history of the fact that PC 300 has connected to a network (network A) different from network B to which it is normally connected.

When a result of successful authentication is received from router 100B (step S6), router 100A transfers the print job to MFP 500A-1 which serves as the storage MFP in network A, as a ubiquitous print job in network A (step S7).

When MFP 500A-1 which serves as the storage MFP accepts the print job from router 100A, MFP 500A-1 holds the print job in a memory (step S8).

When the user of PC 300 logs in MFP 500A-2 in network A, MFP 500A-2 serves as a client MFP. MFP 500A-2 which has become the client MFP transfers information on the user who has logged in to MFP 500A-1 which serves as the storage MFP in network A, and requests for information on the print job issued by the user (step S9).

Since the print job is held in MFP 500A-1 which serves as the storage MFP, MFP 500A-1 transfers the information on the print job to MFP 500A-2 in response to the request (step S10).

MFP 500A-2 serving as the client MFP has operation panel 56 display an operation screen (not shown), which presents the print job in a selectable manner, based on the information from MFP 500A-1 (step S11), and waits until an operation by the user is accepted.

When the user of PC 300 selects the print job as a job to be printed in the operation screen of MFP 500A-2, MFP 500A-2 requests of MFP 500A-1 serving as the storage MFP for main body data of the selected print job (step S12).

When MFP 500A-2 obtains the main body of the print job from MFP 500A-1 (step S13), MFP 500A-2 prints the job in accordance with an instruction from the user (step S14).

Preferably, MFP 500A-1 which serves as the storage MFP performs authentication as to whether or not the user who has logged in is a user who is permitted to carry out ubiquitous printing. Namely, MFP 500A-1 stores in advance in HDD 53, a user who is permitted to carry out ubiquitous printing, as an approved user. Then, when a request for information on a print job issued by the user who has logged in is made by MFP 500A-2 serving as the client MFP, MFP 500A-1 performs authentication as to whether or not the user is the approved user. When the user is the approved user, MFP 500A-1 returns to MFP 500A-2, the information on the print job issued by the user.

Since PC 300 is used as being normally connected to network B, the user of PC 300 is not registered as the approved user in MFP 500A-1 serving as the storage MFP. Therefore, when authentication is performed in the storage MFP, the print job from the user of PC 300 is not processed in MFP 500A-2 serving as the client MFP. Then, by way of example, when the print job is transferred in step S7 to MFP 500A-1 serving as the storage MFP, router 100A adds to the print job, information representing that the user who has issued the print job is the user of which authentication is not required. When the print job to which this information has been added is a print job of which information has been requested for by MFP 500A-2 serving as the client MFP, MFP 500A-1 serving as the storage MFP outputs the information on the print job to MFP 500A-2 without performing authentication.

Alternatively, when user authentication of the user who has issued the print job has been successful in router 100B in network B, router 100A may output the information on the user to MFP 500A-1 serving as the storage MFP (step S7') and has MFP 500A-1 register the information on the user as a provisionally approved user (step S8'). Thus, even when authentication is performed in MFP 500A-1 serving as the storage MFP, the print job is transferred to MFP 500A-2 serving as the client MFP so that the processing of the print job in MFP 500A-2 is implemented.

Preferably, router 100A allows only MFP 500A-1 to register the information on the user who has issued the print job as the provisionally approved user. Router 100A does not allow another MFP 500A-2 to register the information on the user who has issued the print job. By doing so, leakage or spread of user information can be suppressed.

Preferably, MFP 500A-1 which serves as the storage MFP has HDD 53 register the user of PC 300 as the provisionally approved user for a period defined in advance. Information representing the period may be output from router 100A to MFP 500A-1, together with the information on the user. MFP 500A-1 deletes the user from the approved user registered in HDD 53 after the period elapses. Alternatively, the information representing the period may be stored in router 100A. After the period elapses since router 100A output the information on the user to MFP 500A-1, router 100A instructs MFP 500A-1 to delete the information on the user.

Furthermore, the period may be set in router 100A. The period may be set through an operation by the user accepted by an operation portion (not shown) of router 100A. Alternatively, the period may be set by an instruction accepted by router 100A from PC 300.

More preferably, when the print job issued by the user is not output to network A for a period defined in advance since registration of the user of PC 300 as a provisional user in MFP 500A-1 which serves as the storage MFP, the information on the user may be deleted from the approved user of MFP 500A-1. Router 100A monitors issuance of the print job from the user for the defined period since output of the information on the user to MFP 500A-1. Then, when a corresponding print job was not issued, router 100A instructs MFP 500A-1 to delete the information on the user. Alternatively, when MFP 500A-1 which serves as the storage MFP did not accept the print job from the user for the defined period since registration of the user as the provisionally approved user, it may delete the information on the user from the approved user.

<Functional Configuration>

Figure 5:
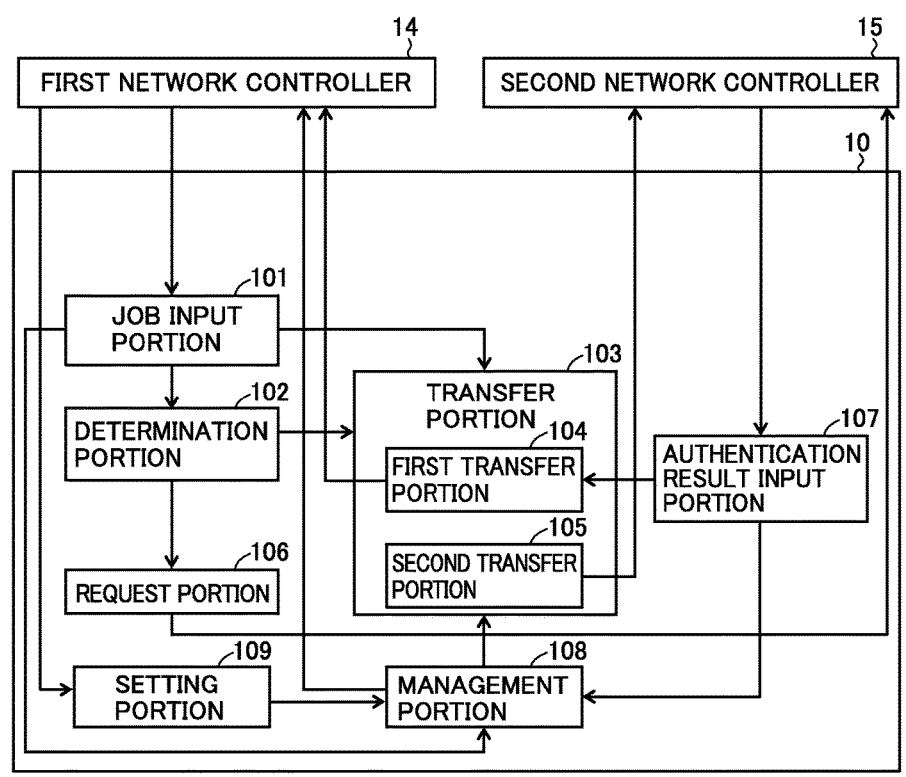
FIG. 5 is a block diagram representing one example of a functional configuration of the router according to the first embodiment.

FIG. 5 is a block diagram representing one example of a functional configuration of router 100 for performing the operations above. A function in FIG. 5 is mainly implemented by CPU 10 as CPU 10 of router 100 reads a program stored in ROM 11 on RAM 12 and executes the program. At least a partial function may be implemented by another configuration shown in FIG. 2 or not-shown hardware such as an electric circuit.

Referring to FIG. 5, CPU 10 of router 100 includes a job input portion 101 for accepting input of a print job, a determination portion 102 for determining a type of the job, and a transfer portion 103 for transferring the print job in accordance with determination by determination portion 102.

Job input portion 101 accepts from first network controller 14, input of a print job output from an apparatus connected to a network including router 100.

Determination portion 102 determines, by referring to a destination of the print job, whether the print job is a ubiquitous print job in a network including router 100, a ubiquitous print job directed to another network, or a normal print job in which printing is carried out in a designated MFP rather than a ubiquitous job. Information representing whether a job is a ubiquitous print job or a normal print job may be added to the print job. In this case, determination portion 102 determines whether the print job is a ubiquitous print job or a normal print job by referring to the added information.

Transfer portion 103 includes a first transfer portion 104 for transferring the print job under the control by first network controller 14 and a second transfer portion 105 for transferring the print job under the control by second network controller 15. First transfer portion 104 transfers the print job to an MFP included in the network including router 100 under the control by first network controller 14. Second transfer portion 105 transfers the print job to a network different from the network including router 100 under the control by second network controller 15.

When the print job is not a ubiquitous print job but a normal print job in which printing is carried out by a designated MFP, first transfer portion 104 or second transfer portion 105 transfers the print job to the designated MFP.

When the print job is the ubiquitous print job, first transfer portion 104 transfers the print job to the storage MFP in the network including router 100.

Preferably, CPU 10 of router 100 further includes a request portion 106. When the print job is a ubiquitous print job to another network different from the network including router 100, request portion 106 requests of another network for authentication of the user who has issued the print job. Specifically, request portion 106 outputs information on the user who has issued the print job to a router included in another network and requests for authentication.

Then, CPU 10 of router 100 further includes an authentication result input portion 107 for accepting input of a result of authentication from the router included in another network. When authentication has been successful, first transfer portion 104 transfers the print job to the storage MFP in the network including router 100.

Preferably, each MFP 500A has a user authentication portion (not shown). The user authentication portion of each MFP 500A authenticates a user who logs in MFP 500A for indicating printing of a print job held in the storage MFP in network A. The user authentication portion of each MFP 500A has had an approved user who is a user permitted to log in stored in HDD 53 in advance. Alternatively, the user authentication portion of each MFP 500A may perform authentication by referring to an approved user stored in another apparatus (not shown) such as an authentication server included in network A. Alternatively, MFP 500A may obtain a result of determination made by another apparatus.

Then, CPU 10 of router 100 further includes a management portion 108 for each MFP 500A to manage the user authentication portion. When user authentication of a user who has issued a print job in another network has been successful, management portion 108 adds that issuing user to a provisionally approved user approved by the user authentication portion of each MFP 500A. Specifically, management portion 108 outputs information on the issuing user to the user authentication portion of each MFP 500A and has the user registered as the provisionally approved user. Alternatively, management portion 108 may output the information on the issuing user to another apparatus such as an authentication server and have the user registered as the provisionally approved user.

More preferably, management portion 108 outputs the information on the issuing user only to the user authentication portion of MFP 500A-1 which serves as the storage MFP holding the print job, and has the user registered as the provisionally approved user. Management portion 108 does not allow another MFP 500A-2 to register the issuing user. By doing so, leakage or spread of user information can be prevented.

More preferably, management portion 108 sets the issuing user as the provisionally approved user for a period defined in advance. Management portion 108 outputs information on the period and the user to MFP 500A, and instructs MFP 500A to delete the information after the period elapses. Alternatively, management portion 108 may instruct MFP 500A to delete the user from the approved user after the period elapses.

Furthermore, CPU 10 of router 100 includes a setting portion 109 for setting the period. Setting portion 109 accepts from PC 300, designation of a period or an instruction for setting via first network controller 14. Alternatively, setting portion 109 may accept designation of the period or an instruction for setting from an operation portion (not shown).

In addition, when a print job issued by the user is not output to network A for a period defined in advance since registration of the user who has issued the print job as the provisional user in MFP 500A, management portion 108 may delete the user from the approved user in MFP 500A. Management portion 108 monitors issuance of the print job from the user for the period defined in advance. Then, when such a print job was not issued, management portion 108 instructs MFP 500A to delete the user. Alternatively, management portion 108 may output the information on the period and the user to MFP 500A. When MFP 500A did not accept the print job from the user for the defined period, it may delete the information on the user.

<Operation Flow>

Figure 6:
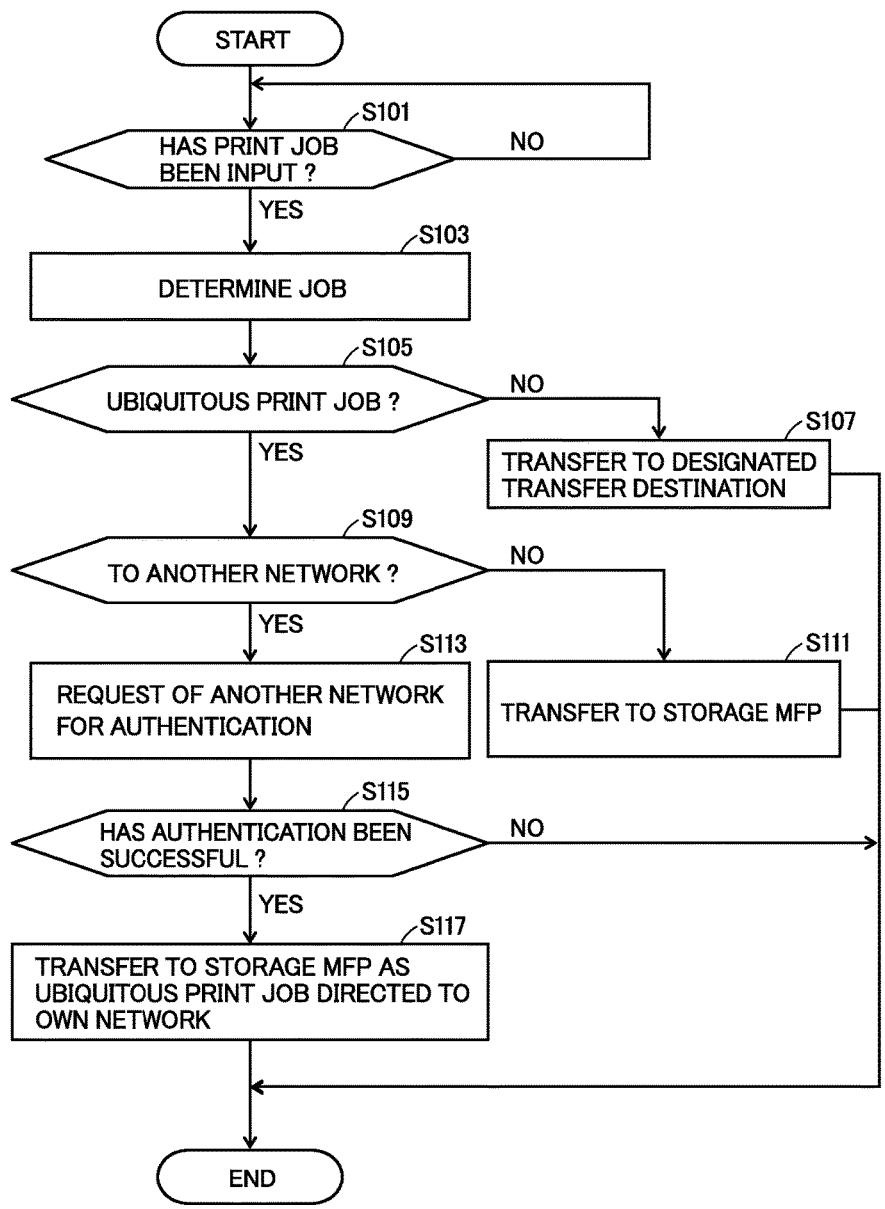
FIG. 6 is a flowchart representing one example of operations in the router according to the first embodiment.

FIG. 6 is a flowchart representing one example of operations in router 100. An operation shown in the flowchart in FIG. 6 is implemented as CPU 10 of router 100 reads a program stored in ROM 11 on RAM 12 and executes the program to thereby exhibit each function in FIG. 5.

Referring to FIG. 6, when a print job is inputted in a network to which router 100 belongs, CPU 10 of router 100 accepts input of the print job (YES in step S101). Then, CPU 10 determines whether the print job is a ubiquitous print job or a normal print job. When the print job is a ubiquitous print job, CPU 10 determines whether the print job is a ubiquitous print job to the network to which router 100 belongs or a ubiquitous print job to another network (step S103).

When the print job is not a ubiquitous print job but a normal print job (NO in step S105), CPU 10 transfers the print job to MFP 500 which is a transfer destination designated by the print job (step S107). Then, CPU 10 quits a series of operations.

When the print job is the ubiquitous print job (YES in step S105) and the ubiquitous print job to the network to which the router itself belongs (NO in step S109), CPU 10 specifies MFP 500 defined in advance as the storage MFP or MFP 500 determined as the storage MFP at the time of transfer, and transfers the print job to specified MFP 500 (step S111). Then, CPU 10 quits a series of operations.

When the print job is the ubiquitous print job and the ubiquitous print job to another network different from the network to which the router itself belongs (YES in step S109), CPU 10 transfers the job as the ubiquitous print job directed to the network to which the router itself belongs, to MFP 500 defined in advance as the storage MFP or MFP 500 determined as the storage MFP at the time of transfer (step S117).

Preferably, when the print job is the ubiquitous print job and the ubiquitous print job directed to another network different from the network to which the router itself belongs, CPU 10 outputs the information on a user who is a source of issuance of the print job to another network, and requests for user authentication (step S113). Then, when user authentication in another network has been successful (YES in step S115), CPU 10 transfers the print job as the ubiquitous print job to the network to which the router itself belongs (step S117). When user authentication has not been successful (NO in step S115), processing in step S117 is not performed but the process in FIG. 6 ends.

CPU 10 specifies a storage MFP to which the ubiquitous print job is to be transferred, among MFPs 500 stored in advance in a storage. Preferably, CPU 10 specifies as the storage MFP, an MFP defined in advance or an MFP specified based on a prescribed condition such as a state of operation or a capacity of HDD 53. Furthermore, CPU 10 similarly specifies also MFP 500 which has the user of PC 300 registered as the provisionally approved user in HDD 53, among MFPs 500 stored in advance in the storage.

Effect of Embodiment

As the operations above are performed in the information processing apparatus exemplified by router 100, convenience of the user can significantly be improved. Namely, even though PC 300 is connected to a network different from a network to which the user's PC 300 is normally connected for ubiquitous printing such as when the user goes on a business trip with his/her PC 300, the user can carry out ubiquitous printing in a new network by performing a similar operation as in usual ubiquitous printing, without complicated setting in advance. Thus, a printing system can be made use of widely in a simplified manner.

Other Examples

In the description above, a network is assumed as what is called a serverless ubiquitous printing system in which the network does not include a server dedicated for holding a print job (what is called a document server). Therefore, router 100 transfers the print job to a storage MFP included in the network when the received print job is a ubiquitous print job.

When the network includes a document server and when the received print job is a ubiquitous print job, router 100 transfers the print job to the document server. Namely, when the print job is the ubiquitous print job to the network to which router 100 belongs, router 100 transfers the print job to the document server. When the received print job is the ubiquitous print job directed to another network different from the network to which router 100 belongs as well, router 100 transfers the print job to the document server as the ubiquitous print job to the network to which router 100 belongs.

Therefore, whether the network is what is called a serverless ubiquitous network or a ubiquitous network including a server, convenience of the user can significantly be improved as the operations above are performed in the information processing apparatus exemplified by router 100.

Second Embodiment

A second embodiment shows a modification of the first embodiment. In the second embodiment, an information processing apparatus which manages information between different networks shown in FIG. 1 is shown. Since a configuration of the system, the router, and the MFP according to the present embodiment is the same as shown in FIGS. 1 to 3, description will not be repeated.

Referring to FIG. 1, in the second embodiment, PC 300 connected to network A issues a print job in response to an operation by a user. The print job issued by PC 300 is saved in MFP 500 which serves as the storage MFP within network A. Then, in response to an operation by the user, MFP 500 which serves as the client MFP within network A processes (prints) the print job.

Thereafter, PC 300 terminates connection to network A and connects to network B which is a conventional network. This is a state that the user of PC 300 returns to his/her original office from a business trip destination with his/her PC 300 and connects PC 300 to the network in the office.

Here, the print job issued by PC 300 may remain in the storage MFP within previous network A. For example, the print job remains when the user of PC 300 did not give an instruction to process the print job or when setting is such that the print job is not deleted from the storage MFP even after processing. The remaining job wastes a memory area in the storage MFP in network A.

Then, when PC 300 terminates connection to network A after connection to network A and connects to network B which is the original network, the system according to the present embodiment deletes the print job associated with PC 300 (or the user of PC 300) saved in the storage MFP in network A. Deletion also includes movement of the print job from the storage MFP in network A to the storage MFP in network B.

In order to allow deletion of the print job, in the system according to the present embodiment, when PC 300 is connected to network B which is the original (base) network (hereinafter referred to as rejoin), an apparatus belonging to network B notifies an apparatus which manages a job in network A of rejoining of PC 300. In response to the notification, the apparatus which manages jobs extracts the print job associated with PC 300 (or the user of PC 300) from among print jobs in network A and deletes the extracted print job (or transfers the print job to network B).

Figure 7:
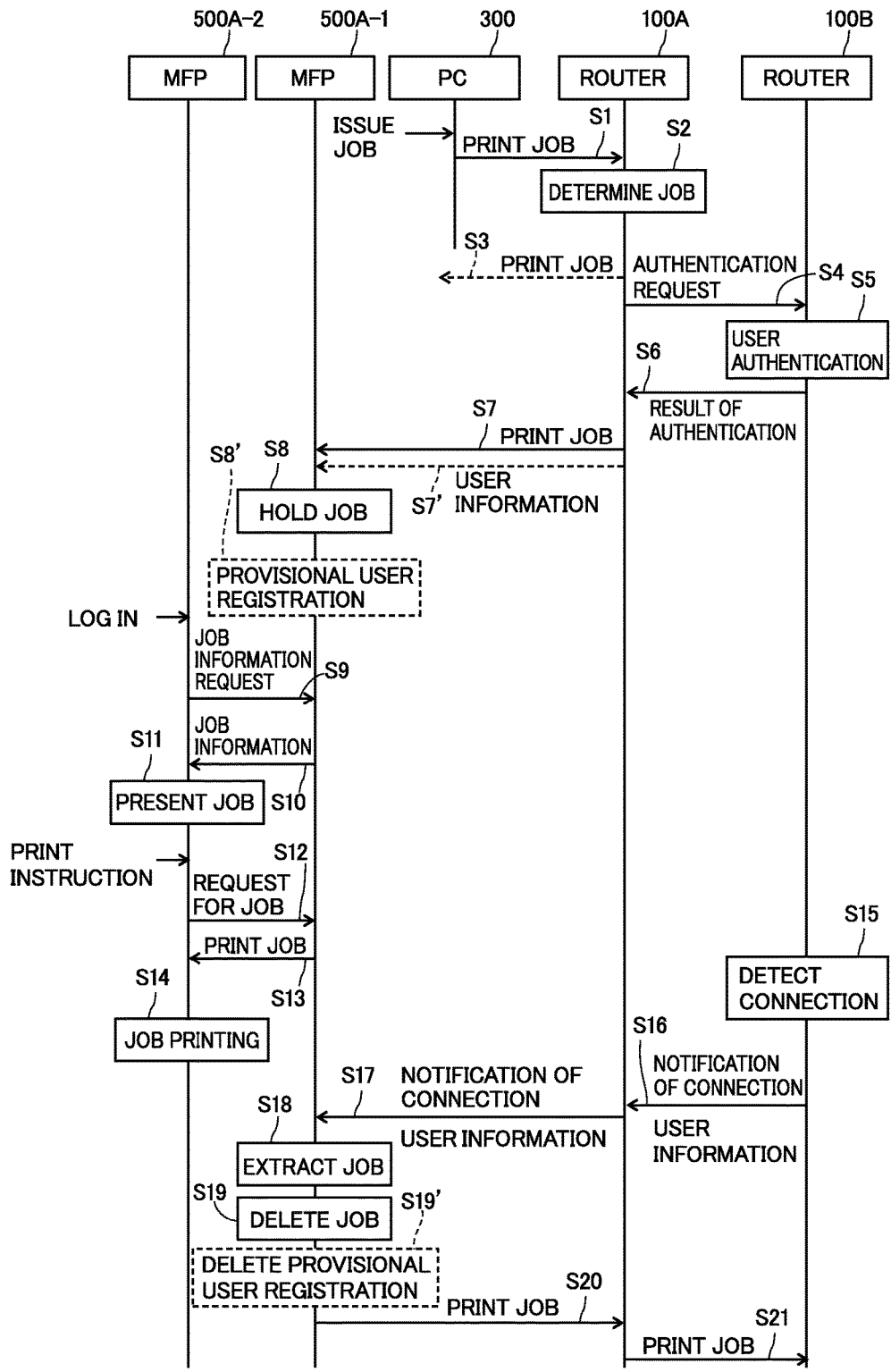
FIG. 7 is a diagram representing overview of operations in the system according to a second embodiment.

FIG. 7 is a diagram representing overview of operations in the system according to the second embodiment. Operations in FIG. 7 the same as in the overview of operations in the system according to the first embodiment in FIG. 4 have the same step numbers (steps S1 to S14) allotted. Therefore, description thereof will not be repeated. Processing in steps S15 to S17 will be described with reference to FIG. 7.

In the system according to the second embodiment, when PC 300 terminates connection to network A and resumes connection to network B, router 100B in network B detects connection (rejoining) of PC 300 (step S15). Router 100B can detect connection of PC 300 by monitoring communication within network B. Router 100B notifies MFP 500A-1 which was the storage MFP in network A of connection of PC 300 through router 100A (steps S16 and S17).

Preferably, when router 100B holds a history of access of PC 300 of which connection has been detected, it notifies MFP 500A-1 of rejoining of PC 300 to network B. Thus, an unnecessary notification from network B to network A can be suppressed.

MFP 500A-1 which has received the notification extracts the print job held in association with the user of PC 300 from the memory (step S18) and deletes the extracted print job (step S19).

Preferably, when router 100B notifies MFP 500A-1 of rejoining of PC 300 to network B, router 100B notifies MFP 500A-1 of also a job name for which user authentication included in the history of access has been requested. MFP 500A-1 which has received the notification deletes the print job of which notification has been given, of print jobs held in association with the user of PC 300 from the memory.

Alternatively, preferably, router 100B reads information on the history of the print job from PC 300 and notifies MFP 500A-1 of the history information in notifying MFP 500A-1 of rejoining of PC 300 to network B. MFP 500A-1 which has received the notification deletes from the memory, the print job included in the history information of PC 300, of the print jobs held in association with the user of PC 300.

MFP 500A-1 may transfer the extracted print job to network B through router 100 (steps S20 and S21).

The apparatus which notifies a device in network A of rejoining of PC 300 to network B is not limited to router 100B. Namely, an apparatus instructing network A to delete the print job associated with PC 300 is not limited to router 100B. An MFP which has been accessed first by PC 300 after its connection to network B among MFPs 500B included in network B may notify a device in network A of rejoining of PC 300 to network B. When network B includes a server dedicated for holding a print job (what is called a document server) (as will be described in a fifth embodiment), the server may notify a device in network A of rejoining of PC 300 to network B.

Preferably, when a notification of rejoining is accepted and a corresponding job is deleted, MFP 500A-1 may delete provisional registration of the user of PC 300 as a provisionally approved user which was made in step S8' (step S19'). Thus, waste of a memory area can be avoided.

<Functional Configuration>

Figure 8:
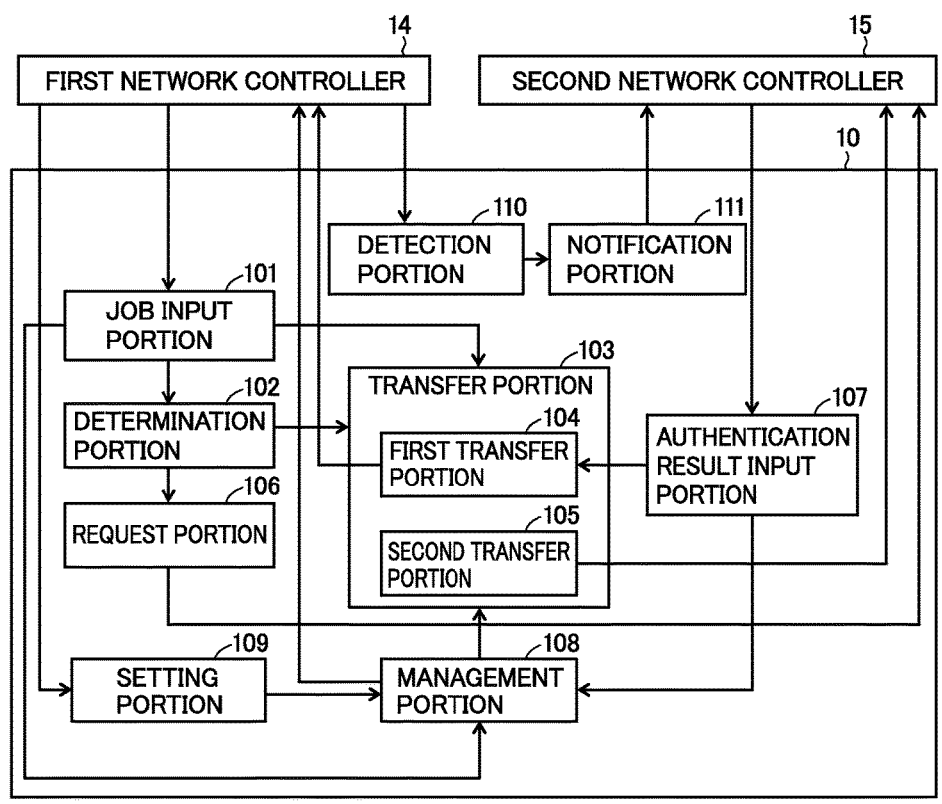
FIG. 8 is a block diagram representing one example of a functional configuration of the router according to the second embodiment.

FIG. 8 is a block diagram representing one example of a functional configuration of router 100 for performing the operations above. The functional configuration in FIG. 8 includes a detection portion 110 and a notification portion 111 in addition to the configuration of router 100 in FIG. 5. A function in FIG. 8 the same as the function in FIG. 5 has the same reference character allotted. Therefore, description thereof will not be repeated.

Referring to FIG. 8, CPU 10 of router 100 includes detection portion 110 for detecting a condition of connection of an apparatus to the network to which router 100 belongs. Detection portion 110 detects a condition of connection of each apparatus, for example, by monitoring communication within the network.

CPU 10 of router 100 includes notification portion 111 for outputting a notification of a condition of connection of an apparatus to the network to which router 100 belongs, to a notification destination defined in advance. The notification destination defined in advance may be, for example, a notification destination set in advance for router 100, such as an apparatus used by a manager. Alternatively, in a case that a notification of change in condition of connection of PC 300 which has rejoined the network after its connection to an external network as described above is given, the notification destination defined in advance may be the external network.

Figure 9:
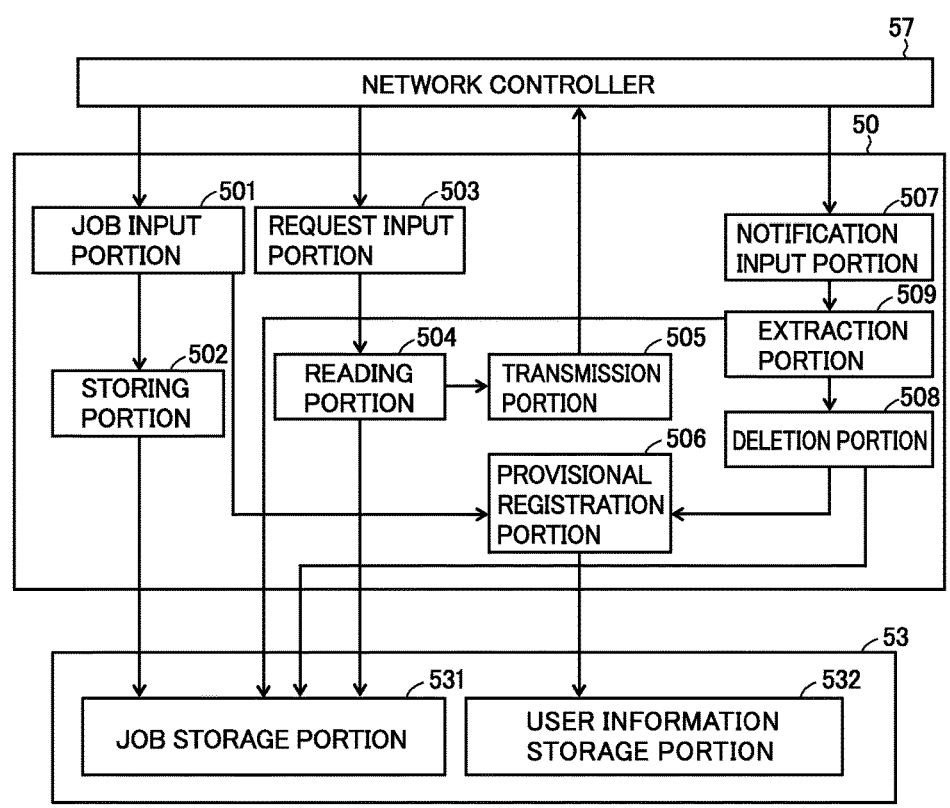
FIG. 9 is a block diagram representing one example of a functional configuration of the MFP according to the second embodiment.

FIG. 9 is a block diagram representing one example of a functional configuration of MFP 500 for functioning as a storage MFP and an apparatus for managing a print job A function in FIG. 9 is mainly implemented by CPU 50 as CPU 50 of MFP 500 reads a program stored in ROM 51 on RAM 52 and executes the program. At least a partial function may be implemented by hardware shown in FIG. 3 or not-shown hardware such as an electric circuit.

Referring to FIG. 9, CPU 50 of MFP 500 includes a job input portion 501 and a storing portion 502. Job input portion 501 accepts input of a print job from another apparatus. Storing portion 502 has an accepted print job stored in a job storage portion 531 which is an area for storing a job included in HDD 53.

Storing portion 502 included in CPU 50 of MFP 500 and determination portion 102 or transfer portion 103 included in CPU 10 of router 100 correspond to a control unit for controlling storage of a print job in job storage portion 531 of MFP 500A in network A when a print job is a ubiquitous print job directed to network B and output to network A to which PC 300 is connected.

CPU 50 of MFP 500 further includes a request input portion 503, a reading portion 504, and a transmission portion 505. Request input portion 503 accepts a request for job information of a print job from another apparatus or a request for a print job main body. Reading portion 504 reads the requested job information or job main body from job storage portion 531. Transmission portion 505 transmits the requested job information or job main body to an apparatus which has issued a request.

Preferably, CPU 50 of MFP 500 includes a provisional registration portion 506 for registering user information in a user information storage portion 532 which is an area for storing user information included in HDD 53, as a provisionally approved user. When an input print job is a ubiquitous job output to a network different from a network to which MFP 500 belongs and a print job for which user authentication in the different network has been successful, provisional registration portion 506 registers the user information associated with the print job as the provisionally approved user.

CPU 50 of MFP 500 further includes a notification input portion 507, a deletion portion 508, and an extraction portion 509. Notification input portion 507 accepts a notification of rejoining of connection of PC 300 from the network different from the network to which MFP 500 belongs. Extraction portion 509 extracts a print job associated with the user of PC 300 for which notification has been given, from among print jobs stored in job storage portion 531. Then, deletion portion 508 deletes the extracted print job.

Figure 10:
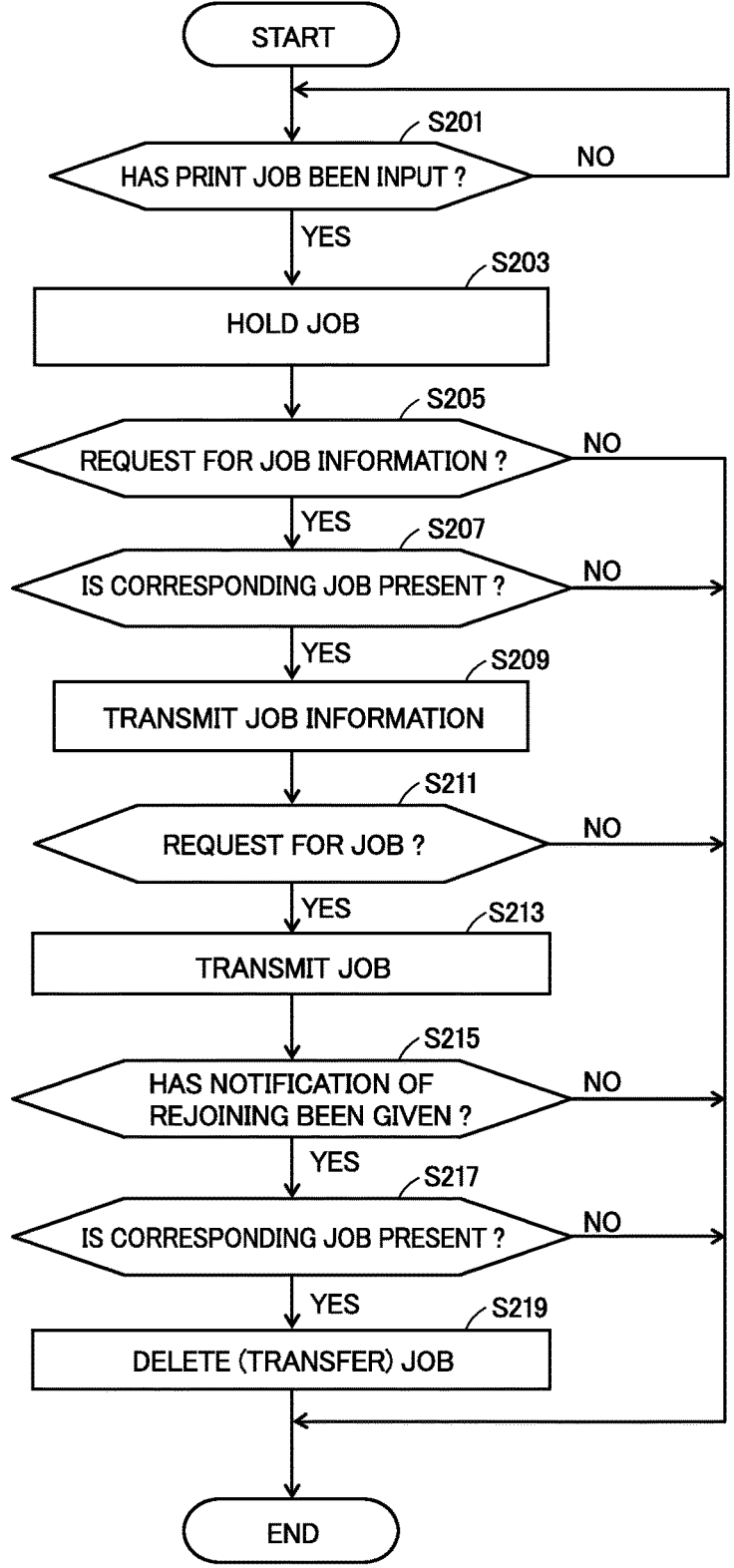
FIG. 10 is a flowchart representing one example of operations in the MFP according to the second embodiment.

FIG. 10 is a flowchart representing one example of operations in MFP 500 according to the second embodiment. An operation shown in the flowchart in FIG. 10 is implemented as CPU 50 of MFP 500 reads a program stored in ROM 51 on RAM 52 and executes the program to thereby exhibit each function in FIG. 9.

Referring to FIG. 10, CPU 50 of MFP 500 determines whether or not to accept input of a print job (step S201). When input of the print job is not accepted (NO in step S201), processing in step S201 is repeated. When input of the print job is accepted (YES in step S201), CPU 50 has HDD 53 store (hold) the print job (step S203). When CPU 50 accepts a request for job information from another apparatus (YES in step S205), it retrieves the corresponding print job in HDD 53 (step S207). CPU 50 receives information specifying PC 300 (or information on the user of PC 300) in step S205. Then, CPU 50 retrieves the print job associated with PC 300 (or the user information) and determines whether or not HDD 53 holds the print job. When a request for job information is not accepted (NO in step S205), the process ends.

When the corresponding print job is held (YES in step S207), CPU 50 transmits the job information on the print job to the apparatus which has made a request (step S209). Thereafter, when a request for the print job main body is accepted (YES in step S211), CPU 50 transmits the main body of the corresponding print job to the apparatus which has made a request (step S213). When the corresponding print job is not held (NO in step S207) or when a request for the print job main body is not accepted (NO in step S211), the process ends.

When CPU 50 accepts a notification that PC 300 has rejoined the network to which the MFP belongs (YES in step S215), it retrieves the corresponding print job. CPU 50 receives user information in step S215. Then, CPU 50 retrieves the print job associated with the user information, and determines whether or not HDD 53 holds the print job. When a notification of rejoining of PC 300 is not accepted (NO in step S215), the process ends.

When the corresponding print job is held (YES in step S217), CPU 50 deletes the print job (step S219). In step S219, CPU 50 deletes the corresponding print job from HDD 53 of MFP 500 and may transfer the print job to the network. When the corresponding print job is not held (NO in step S217), the process ends.

Third Embodiment

The present third embodiment shows a modification of the second embodiment. In the system according to the second embodiment, a print job associated with a user of PC 300 is deleted from network A as a notification of rejoining of PC 300 to network B is given to network A from the original network (network B) to which PC 300 belongs. Thus, after PC 300 terminates connection to network A and rejoins network B, the print job associated with PC 300 can be deleted from the storage MFP in network A.

The system according to the third embodiment uses a history of operations on a print job to be deleted, in order to extract such a print job. Since the configuration of the system according to the third embodiment and the configuration of router 100, PC 300, and MFP 500 included in the system are the same as the configuration according to the first embodiment, description thereof will not be repeated.

<Operation Overview>

Figure 11:
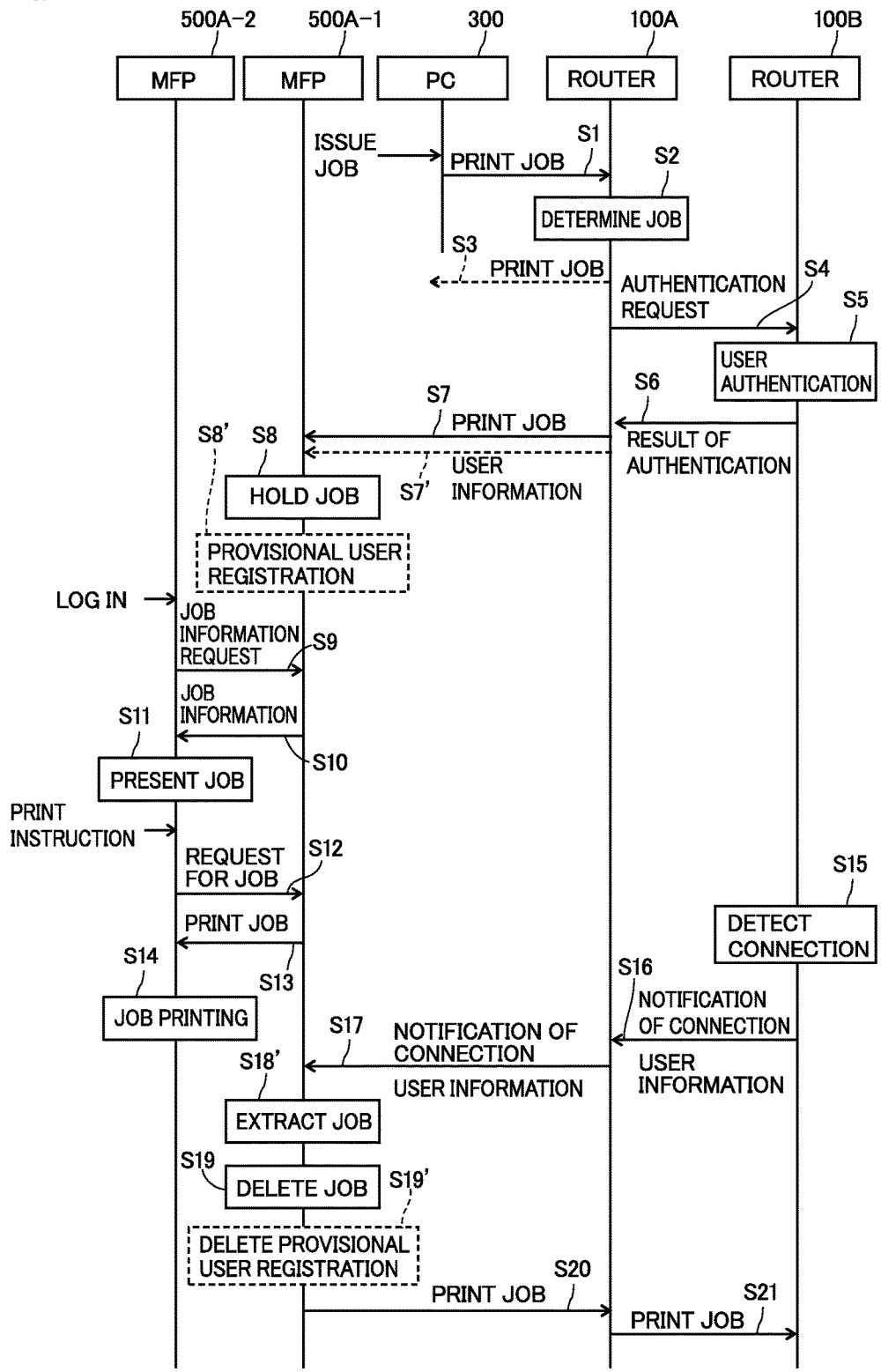
FIG. 11 is a diagram representing overview of operations in the system according to a third embodiment.

FIG. 11 is a diagram representing overview of operations in the system according to the third embodiment. An operation in FIG. 11 is the same as in the overview of operations in the system according to the second embodiment in FIG. 7 has the same step number allotted. Therefore, description thereof will not be repeated.

Referring to FIG. 11, in the system according to the third embodiment, after MFP 500A-1 which serves as the storage MFP in network A receives a notification of rejoining of PC 300 to network A from an apparatus belonging to network B such as router 100B (steps S16 and S17), a print job to be deleted is extracted (step S18'). Preferably, when MFP 500A-1 receives the notification of rejoining, it extracts a print job to be deleted. Alternatively, processing for extracting a print job to be deleted may be performed before the notification of rejoining, for example, at the timing of output of a print job from MFP 500A-1 to MFP 500A-2 which serves as the client MFP. In MFP 500A-1, at least processing for deleting the print job which will be described later is performed after notification of rejoining.

In extracting a print job to be deleted, MFP 500A-1 makes use of a history of operations onto each print job. Therefore, when MFP 500A-1 which serves as the storage MFP outputs a print job to the client MFP, it writes the history of operations onto the print job in HDD 53. Then, by referring to the history of operations written in HDD 53, MFP 500A-1 extracts a print job to be deleted in step S18'. Preferably, MFP 500A-1 extracts a print job to be deleted in accordance with the history of operations, from among the print jobs held in HDD 53 for a period defined in advance since acceptance of an input. Then, MFP 500A-1 deletes the extracted print job (step S19).

In step S18', by way of example, MFP 500A-1 extracts as the print job to be deleted, a print job processed (printed) in response to an instruction from PC 300, that is, a print job output to the client MFP, from among print jobs associated with information on the user of PC 300. This extraction method is based on a concept that an already printed print job has already become unnecessary.

In another example, in step S18', MFP 500A-1 extracts as a print job to be deleted, a print job which has not been processed (printed) in response to an instruction from PC 300, that is, a print job not output to the client MFP, from among print jobs associated with information on the user of PC 300. This extraction method is based on a concept that a print job which has not been processed (printed) for the period defined above has already become unnecessary.

In the present embodiment, processing for extracting a print job to be deleted is performed by MFP 500A-1 which is an apparatus belonging to network A. The processing, however, may be performed by an apparatus belonging to network B. In this case, when MFP 500A-1 which serves as the storage MFP in network A accepts a notification of rejoining of PC 300 to network B from an apparatus belonging to network B, it notifies router 100B in network B of a history of operations onto a print job associated with the information on the user of PC 300 and written in HDD 53. Router 100B which has accepted the notification or the apparatus belonging to network B (the apparatus being an MFP which has been accessed first by PC 300 after connection of PC 300 to network B, among MFPs 500B included in network B) reads information on a history of the print job from PC 300. Alternatively, router 100B which has accepted the notification or the apparatus belonging to network B reads the history of access of PC 300. Then, for example, the apparatus belonging to network B such as router 100B extracts a print job to be deleted based on comparison between the history of operations of which notification was given from network A and the information on the history of the print job of PC 300 or the history of access. Namely, router 100B also extracts as the print job to be deleted, a print job processed (printed) in response to an instruction from PC 300 from among print jobs associated with information on the user of PC 300 or a print job not processed (printed) in response to an instruction from PC 300 from among print jobs associated with the information on the user of PC 300, based on comparison of such histories.

<Functional Configuration>

Figure 12:
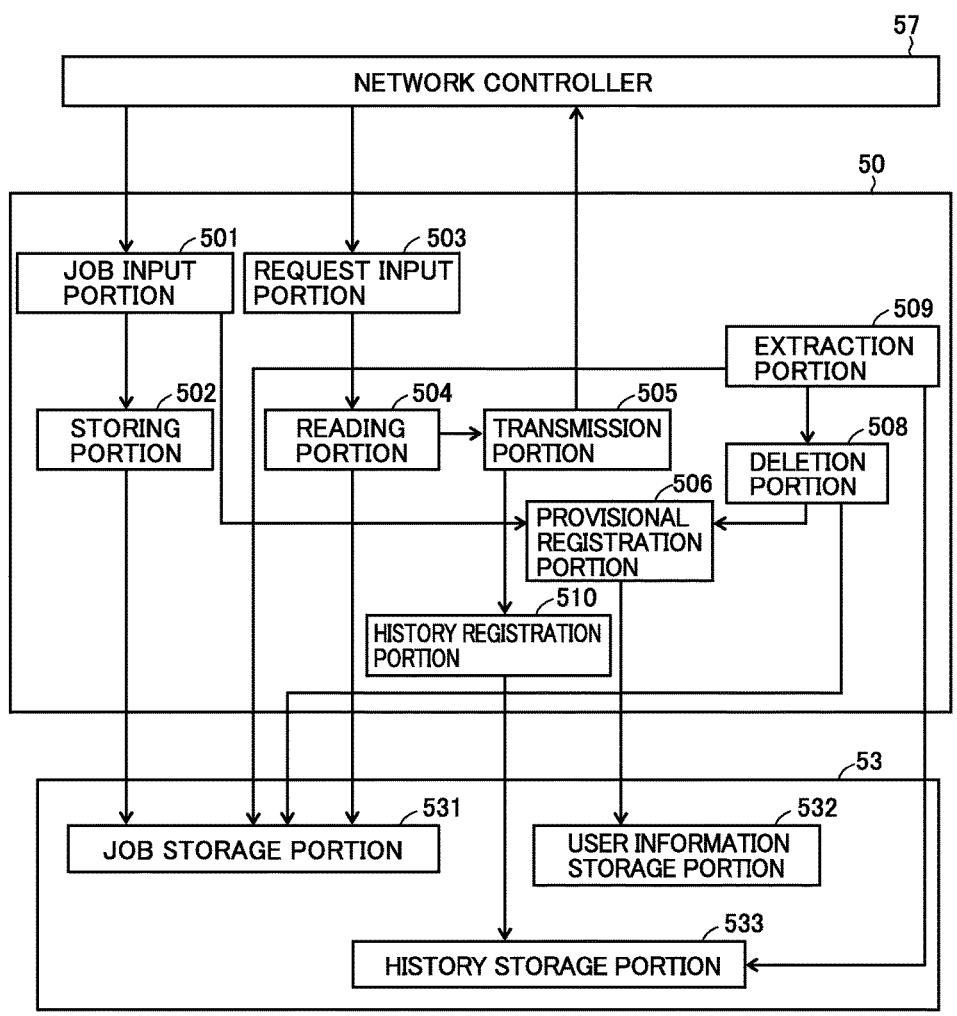
FIG. 12 is a block diagram representing one example of a functional configuration of the MFP according to the third embodiment.

FIG. 12 is a block diagram representing one example of a functional configuration of MFP 500 for performing the operations above. A function in FIG. 12 is also mainly implemented by CPU 50 as CPU 50 of MFP 500 reads a program stored in ROM 51 on RAM 52 and executes the program. At least a partial function may be implemented by the hardware shown in FIG. 3 or not-shown hardware such as an electric circuit. A function in FIG. 12 the same as the function of MFP 500 according to the second embodiment in FIG. 9 has the same reference character allotted. Therefore, description thereof will not be repeated. In FIG. 12, a history registration portion 510 is added to the configuration shown in FIG. 9.

Referring to FIG. 12, CPU 50 of MFP 500 according to the third embodiment further includes history registration portion 510. History registration portion 510 has a history of operations onto a print job which is stored in job storage portion 531 stored in history storage portion 533 which is an area for storing a history of operations included in HDD 53. By way of example, history registration portion 510 has a history of transmission of a print job transmitted by transmission portion 505 to another MFP registered in history storage portion 533 as a history of operations onto the print job.

In the third embodiment, extraction portion 509 extracts a print job to be deleted by referring to the history of operations onto the print job which is stored in history storage portion 533.

<Operation Flow>

Figure 13:
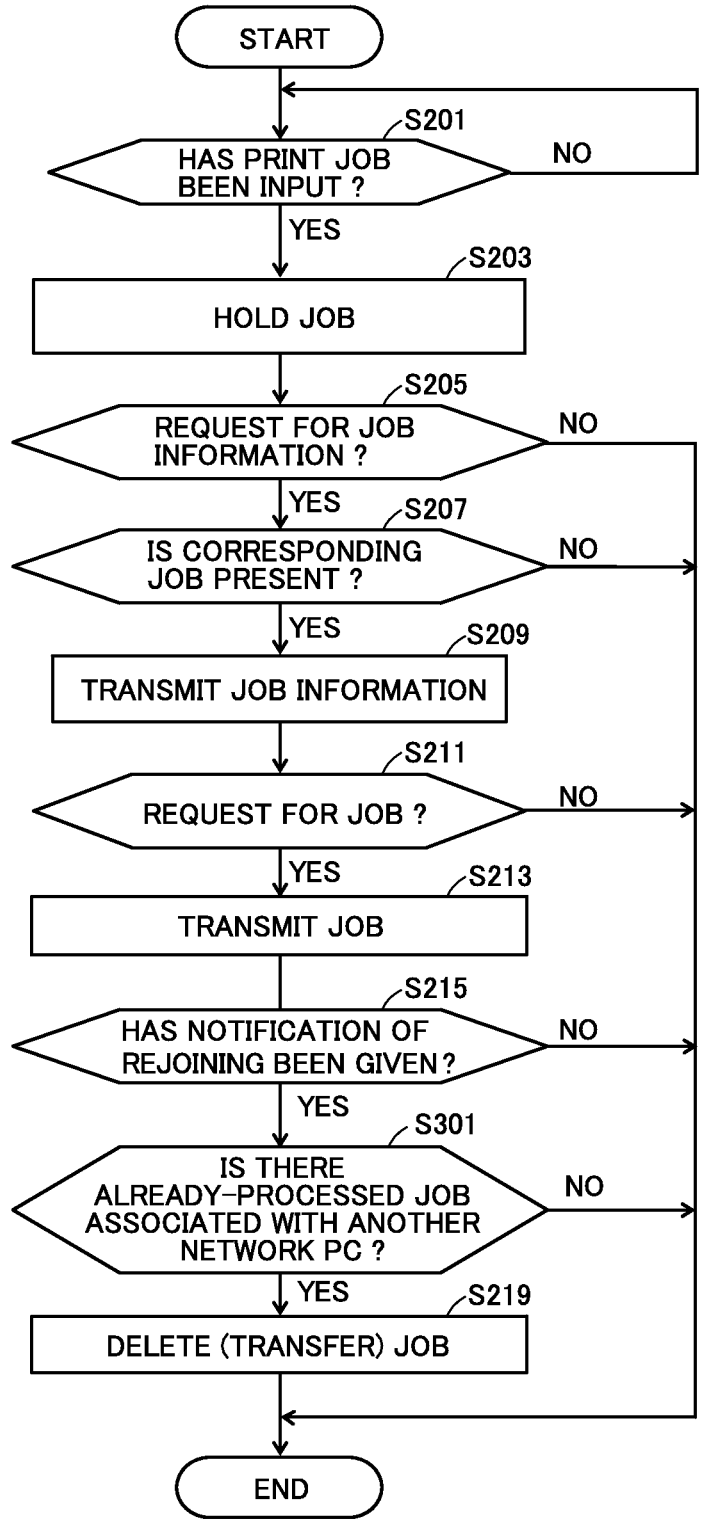
FIG. 13 is a flowchart representing one example of operations in the MFP according to the third embodiment.

FIG. 13 is a flowchart representing one example of operations in MFP 500 according to the third embodiment. An operation shown in the flowchart in FIG. 13 is implemented as CPU 50 of MFP 500 reads a program stored in ROM 51 on RAM 52 and executes the program to thereby exhibit each function in FIG. 12. An operation in FIG. 13 the same as the operation by MFP 500 according to the second embodiment in FIG. 10 has the same step number allotted. Therefore, description thereof will not be repeated.

Referring to FIG. 13, CPU 50 of MFP 500 according to the third embodiment performs operations in steps S201 to step S215. Thereafter, CPU 50 extracts as a print job to be deleted, a print job associated with the user of PC 300 belonging to another network, for which printing processing has already been performed in response to an instruction from PC 300, from among held print jobs. When it is determined that the corresponding print job is held in HDD 53 based on a result of extraction (YES in step S301), CPU 50 deletes the extracted print job (step S219). When it is determined that the corresponding print job is not held (NO in step S301), the process in FIG. 13 ends.

Fourth Embodiment

A fourth embodiment shows a modification of the embodiments above. In the system according to the second embodiment and the system according to the third embodiment, a storage MFP functioning as an apparatus for managing a print job automatically extracts a print job to be deleted and deletes the extracted print job.

In deleting the print job, the system according to the fourth embodiment accepts an operation by the user. Since the configuration of the system according to the fourth embodiment and the configuration of router 100, PC 300, and MFP 500 included in the system are the same as the configuration according to the first embodiment, description thereof will not be repeated.

<Operation Overview>

Figure 14:
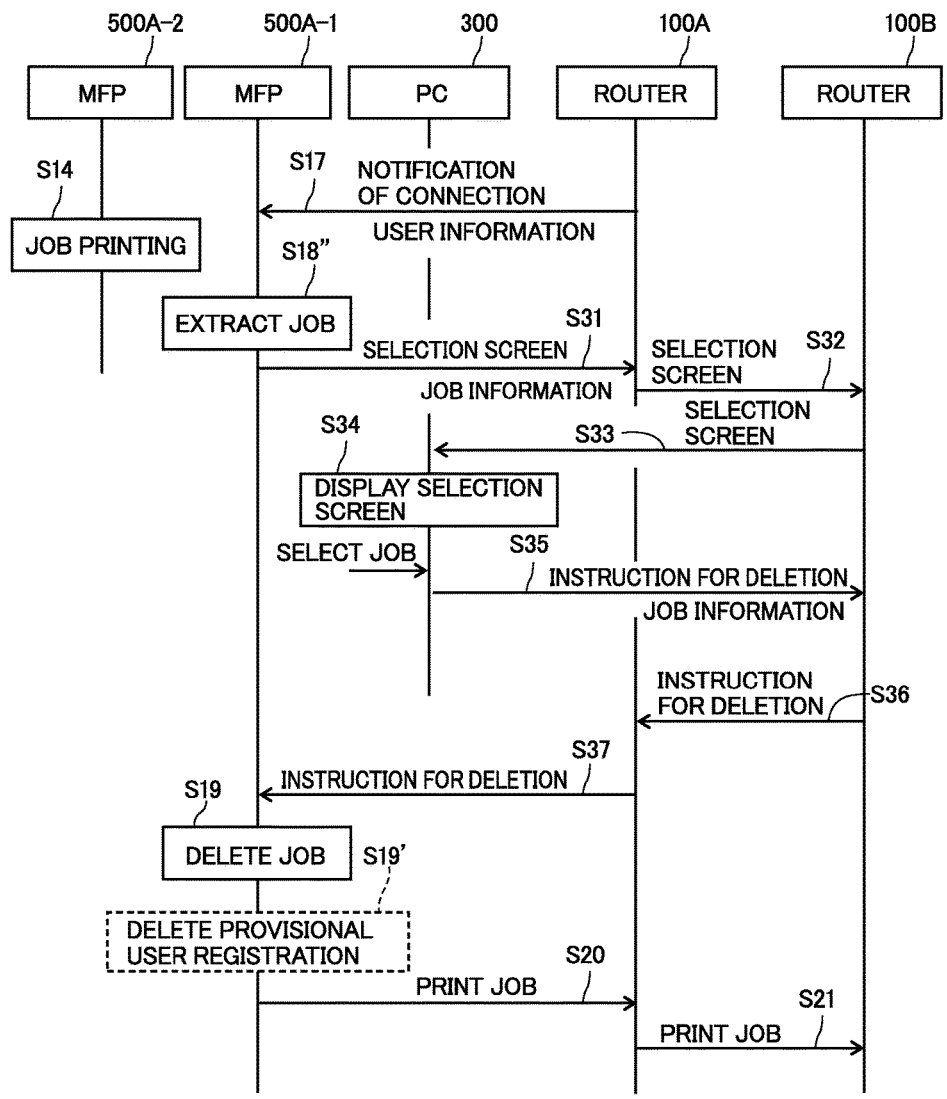
FIG. 14 is a diagram representing overview of operations in the system according to a fourth embodiment.

FIG. 14 is a diagram representing overview of operations in the system according to the fourth embodiment. An operation in FIG. 14 the same as in the overview of operations in the system according to the second embodiment in FIG. 7 has the same step number allotted. FIG. 14 shows an operation after step S17 in FIG. 7.

Referring to FIG. 14, in the system according to the fourth embodiment, after MFP 500A-1 which serves as the storage MFP in network A receives a notification of rejoining of PC 300 to network B from an apparatus belonging to network B such as router 100B (step S17), it extracts a job to be deleted (step S18"). Preferably, when MFP 500A-1 accepts the notification, it extracts a print job to be deleted. Alternatively, in the fourth embodiment as well, as in the second embodiment, processing for extracting a print job to be deleted may be performed before the notification of rejoining, for example, at the timing of output of a print job from MFP 500A-1 to MFP 500A-2 which serves as the client MFP. In MFP 500A-1, at least processing for deleting a print job which will be described later is performed after the notification of rejoining.

In step S18", by way of example, MFP 500A-1 extracts a print job associated with the user of PC 300 belonging to another network. Then, CPU 50 transmits information on a selection screen for selecting a print job to be deleted from among extracted print jobs, that is, information including job information on an extracted print job, to PC 300 through routers 100A and 100B (steps S31 to S33).

When PC 300 receives the information on the selection screen, it displays the selection screen in accordance with the received information (step S34). PC 300 accepts an operation by the user to select a print job to be deleted. Then, PC 300 transmits an instruction for deletion based on the operation by the user to MFP 500A-1 through routers 100A and 100B (steps S35 to S37).

MFP 500A-1 deletes the selected print job in response to an instruction for deletion from PC 300 (step S19).

<Functional Configuration>

Figure 15:
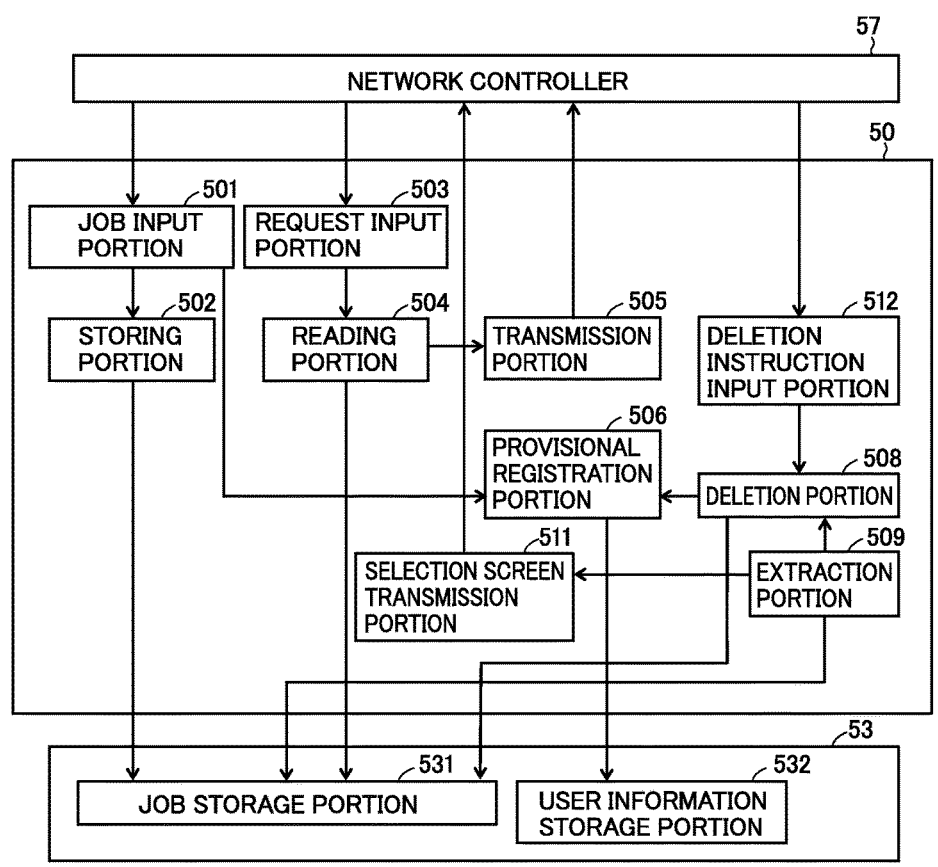
FIG. 15 is a block diagram representing one example of a functional configuration of the MFP according to the fourth embodiment.

FIG. 15 is a block diagram representing one example of a functional configuration of MFP 500 for performing the operations above. A function in FIG. 15 is also mainly implemented by CPU 50 as CPU 50 of MFP 500 reads a program stored in ROM 51 on RAM 52 and executes the program. At least a partial function may be implemented by the hardware shown in FIG. 3 or not-shown hardware such as an electric circuit. A function in FIG. 15 the same as the function of MFP 500 according to the second embodiment in FIG. 9 has the same reference character allotted. Therefore, description thereof will not be repeated.

Referring to FIG. 15, CPU 50 of MFP 500 according to the fourth embodiment further includes a selection screen transmission portion 511 and a deletion instruction input portion 512. In the fourth embodiment, extraction portion 509 extracts a print job associated with the user of PC 300 from among print jobs stored in job storage portion 531. Selection screen transmission portion 511 transmits to PC 300, a screen for selecting a print job to be deleted from among print jobs extracted by extraction portion 509. Deletion instruction input portion 512 accepts input of an instruction for deletion from PC 300. Deletion portion 508 deletes the selected print job in response to the accepted instruction.

<Operation Flow>

Figure 16:
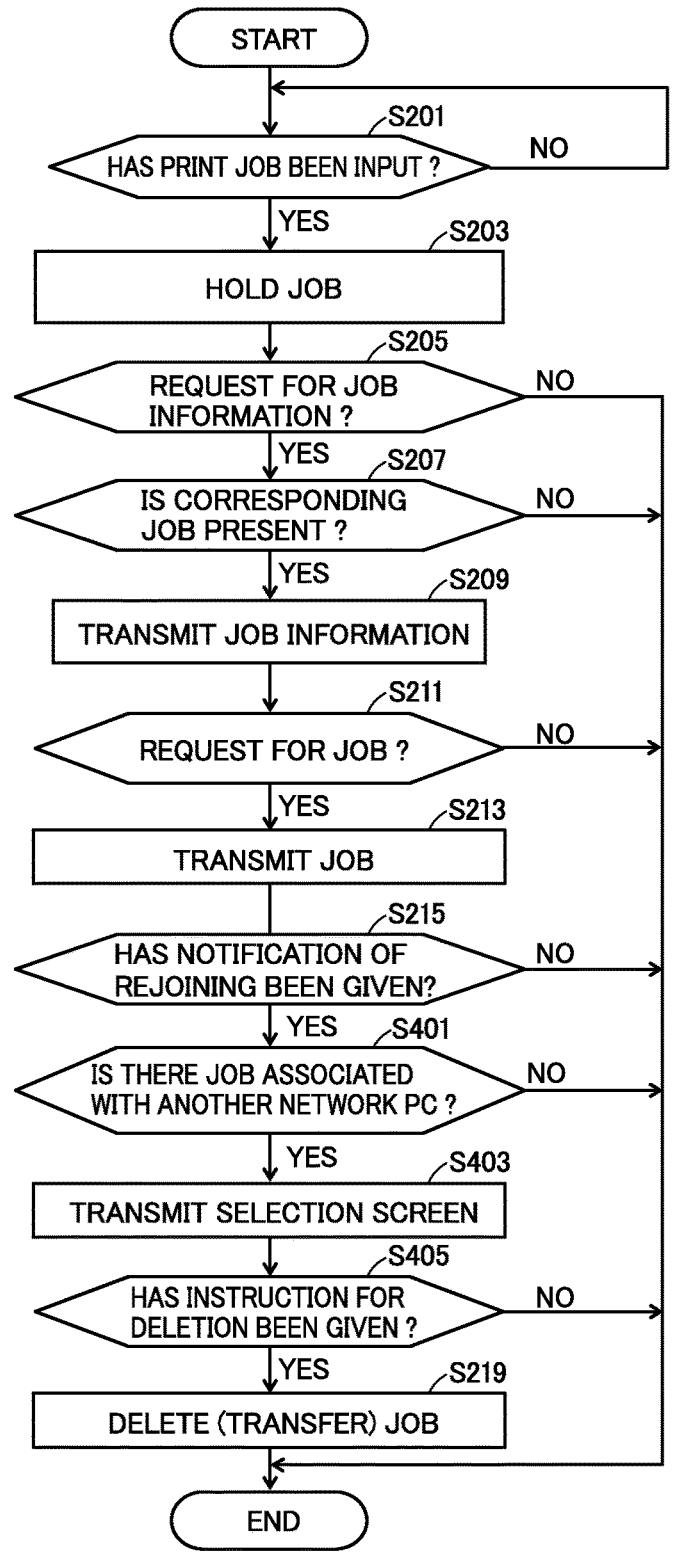
FIG. 16 is a flowchart representing one example of operations in the MFP according to the fourth embodiment.

FIG. 16 is a flowchart representing one example of operations in MFP 500 according to the fourth embodiment. An operation shown in the flowchart in FIG. 16 is implemented as CPU 50 of MFP 500 reads a program stored in ROM 51 on RAM 52 and executes the program to thereby exhibit each function in FIG. 15. An operation in FIG. 16 the same as the operation of MFP 500 according to the second embodiment in FIG. 10 has the same step number allotted. Therefore, description thereof will not be repeated.

Referring to FIG. 16, CPU 50 of MFP 500 according to the fourth embodiment performs operations in steps S201 to S215. Thereafter, CPU 50 extracts a print job associated with the user of PC 300 belonging to another network, from among held print jobs (step S401). When the associated print job is held in HDD 53 (YES in step S401), CPU 50 transmits to PC 300, information on the selection screen for selecting the extracted (associated) print job as a print job to be deleted (step S403). Thereafter, when CPU 50 accepts an instruction for deletion from PC 300 (YES in step S405), it deletes the selected print job from HDD 53 (step S219). When a print job associated with the user is not extracted (NO in step S401) or an instruction for deletion is not accepted (NO in step S405), the process in FIG. 16 ends.

Effect of Embodiment

As the operations above are performed in the information processing apparatus exemplified by router 100, convenience of the user can significantly be improved. Namely, even though PC 300 is connected to a network different from a network to which the user's PC 300 is normally connected for ubiquitous printing such as when the user goes on a business trip with his/her PC 300, the user can carry out ubiquitous printing in a new network by performing a similar operation as in usual ubiquitous printing, without complicated setting in advance.

Furthermore, as the present system performs the operations above, when PC 300 is connected to a network (network B) to which PC 300 should originally belong, a print job associated with the user of PC 300 which remains held in MFP 500 functioning as a server connected to the network (network A) different from the network can be deleted as necessary. Thus, waste of a memory in the entire network A can be suppressed. In addition, management of a file associated with movement between different networks can appropriately be achieved.

Fifth Embodiment

A fifth embodiment shows a modification of the embodiments above. In the second to fourth embodiments, a network is assumed as what is called a serverless ubiquitous printing system without including a server dedicated for holding a print job (what is called a document server). Therefore, router 100 transfers the print job to a storage MFP included in the network when the received print job is a ubiquitous print job.

When the network includes a document server and when the received print job is a ubiquitous print job, router 100 transfers the print job to the document server. Namely, when the print job is the ubiquitous print job to the network to which router 100 belongs, router 100 transfers the print job to the document server. When the received print job is the ubiquitous print job directed to another network different from the network to which router 100 belongs as well, router 100 transfers the print job to the document server as the ubiquitous print job directed to the network to which router 100 belongs.

Therefore, whether the network is what is called a serverless ubiquitous network or a ubiquitous network including a server, convenience of the user can significantly be improved as the operations above are performed in the information processing apparatus exemplified by router 100.

Sixth Embodiment

A sixth embodiment shows a modification of the embodiments above. In the second to fifth embodiments, the system is a printing system and manages a print job. Information to be managed, however, is not limited to a print job and may be files in general. Namely, when a file associated with a user of PC 300 is stored in a server connected to a network (network A) different from a network (network B) to which PC 300 is normally connected and thereafter it rejoins the original network (network B) of PC 300, the present system may delete the file as necessary. The system according to the sixth embodiment can realize file management with operations the same as the operations described above.

Therefore, even in a case of files in general without being limited to print jobs, the present system can appropriately manage the files. In this case, MFP 500 can be referred to as a file management apparatus.

Seventh Embodiment

A seventh embodiment shows a modification of the embodiments above. In the second to sixth embodiments, MFP 500 serves as a print job management apparatus or a file management apparatus. Any apparatus included in the present system, however, may serve as the management apparatus. For example, router 100 may function as the management apparatus. Alternatively, the present system may further include a dedicated apparatus functioning as the management apparatus.

Eighth Embodiment

An eighth embodiment shows a modification of the embodiments above. Two or more forms of the forms described in the first to seventh embodiments may be combined.

Ninth Embodiment

In the present embodiment, a program to be executed by an information processing apparatus including router 100 described above or a program to be executed by a management apparatus can also be provided. By providing the program, the operations above can be performed by an existing apparatus such as a router, a PC, or an MFP so that the system according to the present embodiment can readily be constructed.

Such a program can also be recorded on a computer-readable recording medium such as a flexible disk, a CD-ROM (Compact Disk-Read Only Memory), a ROM, a RAM, and a memory card adapted to a computer, and can be provided as a program product. Alternatively, the program can also be recorded and provided in a recording medium such as a hard disk contained in the computer. Further, the program can also be provided by downloading through the network.

The program according to the present disclosure may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present disclosure.

Alternatively, the program according to the present disclosure may be provided in a manner incorporated as a part of another program. In such a case as well, the program itself does not include the module included in another program, but the program executes the processing in cooperation with another program. Such a program incorporated in another program may also be encompassed in the program according to the present disclosure.

The provided program product is installed in a program storage portion such as a hard disk for execution. It is noted that the program product includes the program itself and the recording medium recording the program in a non-transitory manner.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An information processing apparatus configured to be included in a first network, said information processing apparatus comprising:
a hardware processor configured to:
capture a job that has been output from a device connected to said first network;
determine whether said captured job is a first type of job designating a specific image formation apparatus or a second type of job different from the first type of job;
in response to determining that said captured job is said second type of job, determine whether said captured job is directed to a second network different from said first network;
transfer, in response to determining that said captured job is directed to said second network, the job to a first memory device included in said first network, without transferring the job to the second network; and
transfer, when it is determined that said captured job is the first type of job, the job to the specific image formation apparatus.

2. The information processing apparatus according to claim 1, wherein the hardware processor is further configured to request determination as to whether the user is a user who is permitted to execute said job, by transferring information on said user to said second network, and transfer said job to said first memory device when said user is determined in said second network as the user who is permitted to execute said job.

3. The information processing apparatus according to claim 2, wherein the hardware processor is further configured to store the information on said user in a second memory device included in said first network when it is determined in said second network that said user is the user who is permitted to execute said job.

4. The information processing apparatus according to claim 3, wherein said information on said user is stored in the second memory device for a defined period.

5. The information processing apparatus according to claim 4, wherein the hardware processor is further configured to receive a setting of said defined period.

6. The information processing apparatus according to claim 3, wherein when said information on said user is stored in said second memory device, the hardware processor transfers said job to said first memory device without issuing a request to the second network for determination as to whether the user is a user who is permitted to execute said job.

7. The information processing apparatus according to claim 3, wherein
said first network includes one or more image formation apparatuses,
said hardware processor is further configured to specify one image formation apparatus among said one or more image formation apparatuses included in said first network, and
said memory device is included in one specified said image formation apparatus.

8. The information processing apparatus according to claim 3, wherein said first network includes one or more image formation apparatuses, and said second memory device is included in each of said one or more image formation apparatuses included in said first network.

9. The information processing apparatus according to claim 3, wherein the hardware processor is further configured to delete said information on said user from said second memory device when the hardware processor does not receive a job from said user for a predetermined period, after said information on said user is stored in said second memory device.

10. The information processing apparatus according to claim 1, wherein
said first network includes one or more image formation apparatuses,
said hardware processor is further configured to specify one image formation apparatus among said one or more image formation apparatuses included in said first network, and
said first memory device is included in one specified said image formation apparatus.

11. An image formation apparatus incorporating the information processing apparatus according to claim 1.

12. The information processing apparatus according to claim 1, wherein the second type of job is a ubiquitous print job.

13. An information processing apparatus configured to be connected to a first network, said information processing apparatus comprising:
a hardware processor configured to:
capture a job that has been output from a device connected to said first network, said job directed to a second network, different from said first network;
transfer, in response to determining that said captured job is directed to said second network, the job to a first memory device included in said first network, without transferring the job to the second network;
extract a file associated with said device from said first memory device; and
delete said file extracted from said first memory device when said device terminates connection to said first network and connects to said second network.

14. The information processing apparatus according to claim 13, wherein said hardware processor deletes said file associated with said device from said first memory device when a notification of connection of said device to said second network is given from a second device connected to said second network.

15. The information processing apparatus according to claim 13, wherein said hardware processor extracts said file associated with said device from said first memory device based on a history of operation on the file associated with said device.

16. The information processing apparatus according to claim 15, wherein said hardware processor extracts from said first memory device, the file associated with said device and outputs said file in said first network.

17. The information processing apparatus according to claim 15, wherein said hardware processor extracts from said first memory device, the file associated with said device and does not output the file in said first network, among files stored in said first memory device.

18. The information processing apparatus according to claim 13, wherein said hardware processor extracts from said first memory device, a file designated by an operation by the user among files stored in said first memory device.

19. The information processing apparatus according to claim 13, wherein
said first network and said second network each include one or more image formation apparatuses,
said file is print job data, and
when a print instruction to said second network is accepted from said device connected to said first network, said file, which is said print job data, is stored in said first memory device.

20. The information processing apparatus according to claim 13, further comprising a transmitter which transmits the file deleted from said first memory device by said hardware processor to said second memory device.

21. An information processing method, comprising:
capturing, by a hardware processor of an information processing apparatus, a job that has been output from a device connected to a first network;
determining, by the hardware processor, whether said captured job is a first type of job designating a specific image formation apparatus or a second type of job different from the first type of job;
in response to determining that said captured job is said second type of job, determining, by the hardware processor, whether said captured job is directed to a second network different from said first network;
in response to determining that said captured job is directed to said second network, transferring, by the hardware processor of the information processing apparatus, the job to a first memory device included in said first network, without transferring the job to the second network; and
in response to determining that said captured job is the first type of job, transferring, by the hardware processor of the information processing apparatus, the job to the specific image formation apparatus.

22. The information processing method according to claim 21, further comprising:
extracting a file associated with said device from said first memory device; and
deleting said extracted file from said first memory device when said device terminates connection to said first network and connects to said second network.

23. A non-transitory computer-readable storage medium storing a program causing a computer of an information processing apparatus to:
- capture a job that has been output from a device connected to a first network;
- determine whether said captured job is a first type of job designating a specific image formation apparatus or a second type of job different from the first type of job;
- in response to determining that said captured job is said second type of job, determine whether said captured job is directed to a second network different from said first network;
- transfer, in response to determining that said captured job is directed to said second network, the job to a first memory device included in said first network, without transferring the job to the second network; and
- transfer, when it is determined that said captured job is the first type of job, the job to the specific image information apparatus.

24. A non-transitory computer-readable storage medium storing a program causing a computer of an information processing apparatus to:
- capture a job that has been output from a device connected to a first network, said job being directed to a second network different from said first network;
- transfer, in response to determining that said captured job is directed to said second network, the job to a first memory device included in said first network, without transferring the job to the second network;
- extract a file associated with said device from said first memory device; and
- delete said extracted file from said first memory device when said device terminates connection to said first network and connects to said second network.

* * * * *